(12) United States Patent
Urushiyama

(10) Patent No.: US 8,923,764 B2
(45) Date of Patent: Dec. 30, 2014

(54) MOBILE TERMINAL DEVICE

(75) Inventor: Tatsuya Urushiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 12/606,316

(22) Filed: Oct. 27, 2009

(65) Prior Publication Data

US 2010/0112946 A1 May 6, 2010

(30) Foreign Application Priority Data

Nov. 5, 2008 (JP) ................................ 2008-284325

(51) Int. Cl.
*H04B 7/00* (2006.01)
*H04W 48/16* (2009.01)
*H04W 88/16* (2009.01)

(52) U.S. Cl.
CPC .............. *H04W 48/16* (2013.01); *H04W 88/16* (2013.01)
USPC ........................................................ 455/41.2

(58) Field of Classification Search
CPC ............................... H04H 60/37; H04W 84/18
USPC ........................................................ 455/512
See application file for complete search history.

(56) References Cited

U.S. PATENT DOCUMENTS

| | | | |
|---|---|---|---|
| 5,805,581 A | 9/1998 | Uchida et al. | |
| 6,009,087 A | 12/1999 | Uchida et al. | |
| 2002/0137514 A1 | 9/2002 | Mitsugi et al. | |
| 2005/0202828 A1* | 9/2005 | Pecen et al. | 455/453 |
| 2006/0246941 A1* | 11/2006 | Watanabe et al. | 455/552.1 |
| 2008/0019339 A1* | 1/2008 | Raju et al. | 370/338 |
| 2010/0093340 A1 | 4/2010 | Buracchini | |

FOREIGN PATENT DOCUMENTS

| | | |
|---|---|---|
| JP | 8-130766 | 5/1996 |
| JP | 2002-252580 | 9/2002 |
| JP | 2002-291011 | 10/2002 |
| JP | 2005-20198 | 1/2005 |
| JP | 2006-60671 | 3/2006 |
| JP | 2006-180412 | 7/2006 |
| WO | 2008/119381 | 10/2008 |

OTHER PUBLICATIONS

European Search Report dated Jun. 16, 2010, from the corresponding European Application.
Notification of Reason for Refusal dated Sep. 25, 2012, from corresponding Japanese Application No. 2008-284325.

* cited by examiner

*Primary Examiner* — Ankur Jain
(74) *Attorney, Agent, or Firm* — Katten Muchin Rosenman LLP

(57) ABSTRACT

A mobile terminal device for communication with other terminal devices via one of a plurality of base stations, at least one of the base stations using a radio access technology different from that of at least one other base station, the mobile terminal device includes: a capturing unit for capturing a radio communication signal transmitted from another mobile terminal device in proximity to the mobile terminal device to determine the radio access technology; a processor for controlling to communicate with one of the other terminal devices in accordance with a process including: determining priority of which of the radio access technologies; seeking one of the radio access technologies currently available in the order of the priority; setting up a radio communication condition using one of the radio access technologies; and initiating communication with one of the other terminal devices via said one of the base stations.

6 Claims, 23 Drawing Sheets

| USED RAT | USED FREQUENCY BAND | FREQUENCY OF OCCURRENCE |
|---|---|---|
| ⋮ | ⋮ | ⋮ |

| USED RAT | USED FREQUENCY BAND | FREQUENCY OF OCCURRENCE |
|---|---|---|
| GSM | f10 | 3 |
| GSM | f2 | 6 |
| WCDMA | f14 | 7 |
| LTE | f9 | 6 |
| GSM | f3 | 0 |
| LTE | f7 | 1 |
| GSM | f11 | 4 |
| WCDMA | f5 | 16 |
| WCDMA | f13 | 9 |
| WCDMA | f15 | 11 |
| WCDMA | f4 | 25 |
| GSM | f1 | 7 |
| LTE | f18 | 4 |
| GSM | f12 | 1 |
| LTE | f17 | 2 |
| WCDMA | f6 | 2 |
| LTE | f8 | 3 |
| LTE | f16 | 8 |

| USED RAT | USED FREQUENCY BAND | FREQUENCY OF OCCURRENCE | PRIORITY |
|---|---|---|---|
| GSM | f10 | 3 | 12 |
| GSM | f2 | 6 | 8 |
| WCDMA | f14 | 7 | 6 |
| LTE | f9 | 6 | 8 |
| GSM | f3 | 0 | 18 |
| LTE | f7 | 1 | 16 |
| GSM | f11 | 4 | 10 |
| WCDMA | f5 | 16 | 2 |
| WCDMA | f13 | 9 | 4 |
| WCDMA | f15 | 11 | 3 |
| WCDMA | f4 | 25 | 1 |
| GSM | f1 | 7 | 6 |
| LTE | f18 | 4 | 10 |
| GSM | f12 | 1 | 16 |
| LTE | f17 | 2 | 14 |
| WCDMA | f6 | 2 | 14 |
| LTE | f8 | 3 | 12 |
| LTE | f16 | 8 | 5 |

FIG. 10

| USED RAT | FREQUENCY OF OCCURRENCE | PRIORITY |
|---|---|---|
| GSM | 21 | 3 |
| WCDMA | 70 | 1 |
| LTE | 24 | 2 |

| USED RAT | USED FREQUENCY BAND |
|---|---|
| GSM | f1 |
| GSM | f2 |
| GSM | f3 |
| GSM | f10 |
| GSM | f11 |
| GSM | f12 |
| LTE | f7 |
| LTE | f8 |
| LTE | f9 |
| LTE | f16 |
| LTE | f17 |
| LTE | f18 |
| WCDMA | f4 |
| WCDMA | f5 |
| WCDMA | f6 |
| WCDMA | f13 |
| WCDMA | f14 |
| WCDMA | f15 |
| ⋮ | ⋮ |

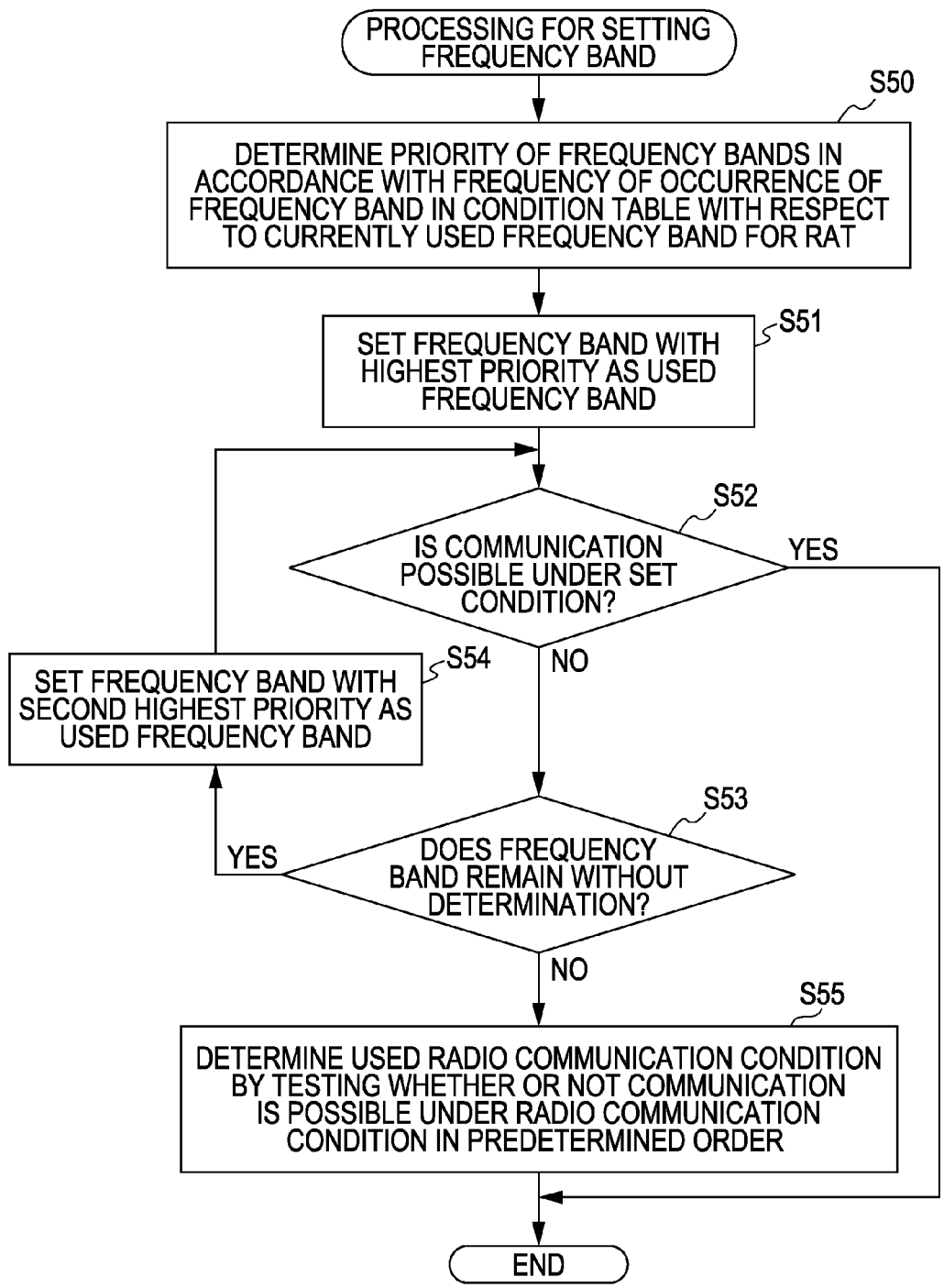

FIG. 13A

| USED FREQUENCY BAND | NUMBER OF OCCURRENCE | PRIORITY |
|---|---|---|
| f1 | 7 | 1 |
| f2 | 6 | 2 |
| f11 | 4 | 3 |
| f10 | 3 | 4 |
| f12 | 1 | 5 |
| f3 | 0 | 6 |

FIG. 13B

| USED FREQUENCY BAND | NUMBER OF OCCURRENCE | PRIORITY |
|---|---|---|
| f4 | 25 | 1 |
| f5 | 16 | 2 |
| f15 | 11 | 3 |
| f13 | 9 | 4 |
| f14 | 7 | 5 |
| f6 | 2 | 6 |

FIG. 13C

| USED FREQUENCY BAND | NUMBER OF OCCURRENCE | PRIORITY |
|---|---|---|
| f16 | 8 | 1 |
| f9 | 6 | 2 |
| f18 | 4 | 3 |
| f8 | 3 | 4 |
| f17 | 2 | 5 |
| f7 | 1 | 6 |

FIG. 14

| USED RAT | USED FREQUENCY BAND | FREQUENCY OF OCCURRENCE |
|---|---|---|
| WCDMA (FREQUENCY =70) | f4 | 25 |
| | f13 | 9 |
| | f6 | 2 |
| | f14 | 7 |
| | f15 | 11 |
| | f5 | 16 |
| LTE (FREQUENCY =24) | f7 | 1 |
| | f16 | 8 |
| | f9 | 6 |
| | f18 | 4 |
| | f8 | 3 |
| | f17 | 2 |
| GSM (FREQUENCY =21) | f1 | 7 |
| | f10 | 3 |
| | f3 | 0 |
| | f11 | 4 |
| | f12 | 1 |
| | f2 | 6 |

FIG. 15

| USED RAT | USED FREQUENCY BAND | FREQUENCY OF OCCURRENCE | PRIORITY |
|---|---|---|---|
| WCDMA (FREQUENCY OF OCCURRENCE = 70) | f4 | 25 | 1 |
| | f13 | 9 | 4 |
| | f6 | 2 | 6 |
| | f14 | 7 | 5 |
| | f15 | 11 | 3 |
| | f5 | 16 | 2 |
| LTE (FREQUENCY OF OCCURRENCE = 24) | f7 | 1 | 12 |
| | f16 | 8 | 7 |
| | f9 | 6 | 8 |
| | f18 | 4 | 9 |
| | f8 | 3 | 10 |
| | f17 | 2 | 11 |
| GSM (FREQUENCY OF OCCURRENCE = 21) | f1 | 7 | 13 |
| | f10 | 3 | 16 |
| | f3 | 0 | 18 |
| | f11 | 4 | 15 |
| | f12 | 1 | 17 |
| | f2 | 6 | 14 |

| USED RAT | FREQUENCY OF OCCURRENCE |
|---|---|
| GSM | 21 |
| WCDMA | 70 |
| LTE | 24 |

| USED FREQUENCY BAND | FREQUENCY OF OCCURRENCE |
|---|---|
| f10 | 3 |
| f2 | 6 |
| f14 | 7 |
| f9 | 6 |
| f3 | 0 |
| f7 | 1 |
| f11 | 4 |
| f5 | 16 |
| f13 | 9 |
| f15 | 11 |
| f4 | 25 |
| f1 | 7 |
| f18 | 4 |
| f12 | 1 |
| f17 | 2 |
| f6 | 2 |
| f8 | 3 |
| f16 | 8 |

FIG. 21

| USED FREQUENCY BAND | FREQUENCY OF OCCURRENCE | PRIORITY |
|---|---|---|
| f10 | 3 | 12 |
| f2 | 6 | 8 |
| f14 | 7 | 6 |
| f9 | 6 | 8 |
| f3 | 0 | 18 |
| f7 | 1 | 16 |
| f11 | 4 | 10 |
| f5 | 16 | 2 |
| f13 | 9 | 4 |
| f15 | 11 | 3 |
| f4 | 25 | 1 |
| f1 | 7 | 6 |
| f18 | 4 | 10 |
| f12 | 1 | 16 |
| f17 | 2 | 14 |
| f6 | 2 | 14 |
| f8 | 3 | 12 |
| f16 | 8 | 5 |

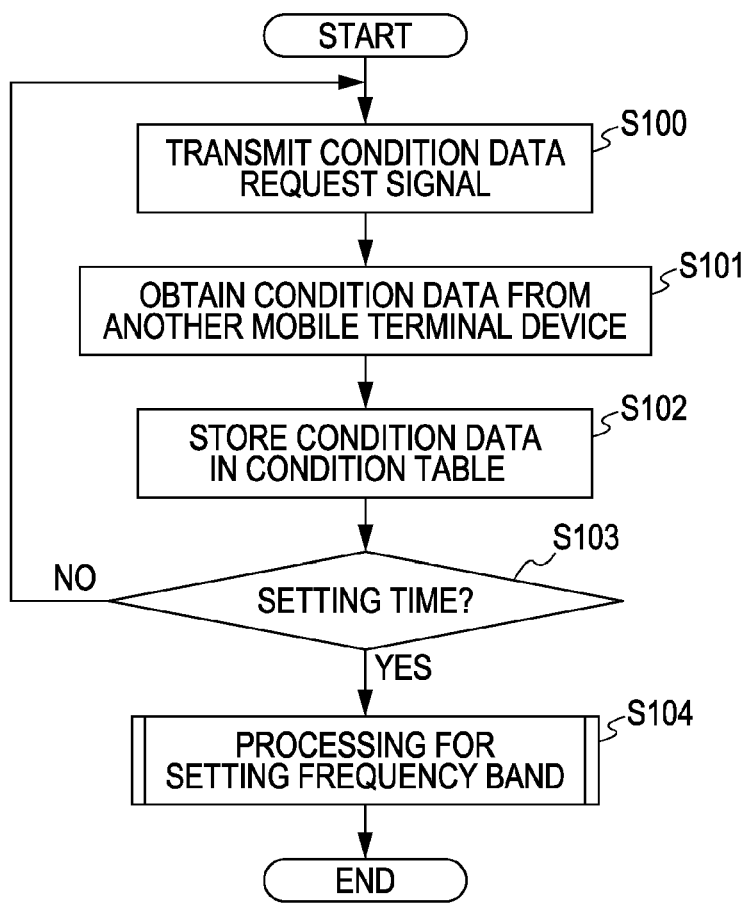

| USED RAT | USED FREQUENCY BAND | COMMUNICATION CARRIER | FREQUENCY OF OCCURRENCE |
|---|---|---|---|
| GSM | f10 | CARRIER B | 3 |
| GSM | f2 | CARRIER A | 6 |
| WCDMA | f14 | CARRIER B | 7 |
| LTE | f9 | CARRIER A | 6 |
| GSM | f3 | CARRIER A | 0 |
| LTE | f7 | CARRIER A | 1 |
| GSM | f11 | CARRIER B | 4 |
| WCDMA | f5 | CARRIER A | 16 |
| WCDMA | f13 | CARRIER B | 9 |
| WCDMA | f15 | CARRIER B | 11 |
| WCDMA | f4 | CARRIER A | 25 |
| GSM | f1 | CARRIER A | 7 |
| LTE | f18 | CARRIER B | 4 |
| GSM | f12 | CARRIER B | 1 |
| LTE | f17 | CARRIER B | 2 |
| WCDMA | f6 | CARRIER A | 2 |
| LTE | f8 | CARRIER A | 3 |
| LTE | f16 | CARRIER B | 8 |

| COMMUNICATION CARRIER | PRIORITY |
|---|---|
| CARRIER A | 1 |
| CARRIER B | 2 |
| CARRIER C | 3 |
| ⋮ | ⋮ |

FIG. 26

| USED RAT | USED FREQUENCY BAND | COMMUNICATION CARRIER | FREQUENCY OF OCCURRENCE | PRIORITY |
|---|---|---|---|---|
| WCDMA | f4 | CARRIER A | 25 | 1 |
| WCDMA | f5 | CARRIER A | 16 | 2 |
| GSM | f1 | CARRIER A | 7 | 3 |
| GSM | f2 | CARRIER A | 6 | 4 |
| LTE | f9 | CARRIER A | 6 | 4 |
| LTE | f8 | CARRIER A | 3 | 6 |
| WCDMA | f6 | CARRIER A | 2 | 7 |
| LTE | f7 | CARRIER A | 1 | 8 |
| GSM | f3 | CARRIER A | 0 | 9 |
| WCDMA | f15 | CARRIER B | 11 | 10 |
| WCDMA | f13 | CARRIER B | 9 | 11 |
| LTE | f16 | CARRIER B | 8 | 12 |
| WCDMA | f14 | CARRIER B | 7 | 13 |
| GSM | f11 | CARRIER B | 4 | 14 |
| LTE | f18 | CARRIER B | 4 | 14 |
| GSM | f10 | CARRIER B | 3 | 16 |
| LTE | f17 | CARRIER B | 2 | 17 |
| GSM | f12 | CARRIER B | 1 | 18 |

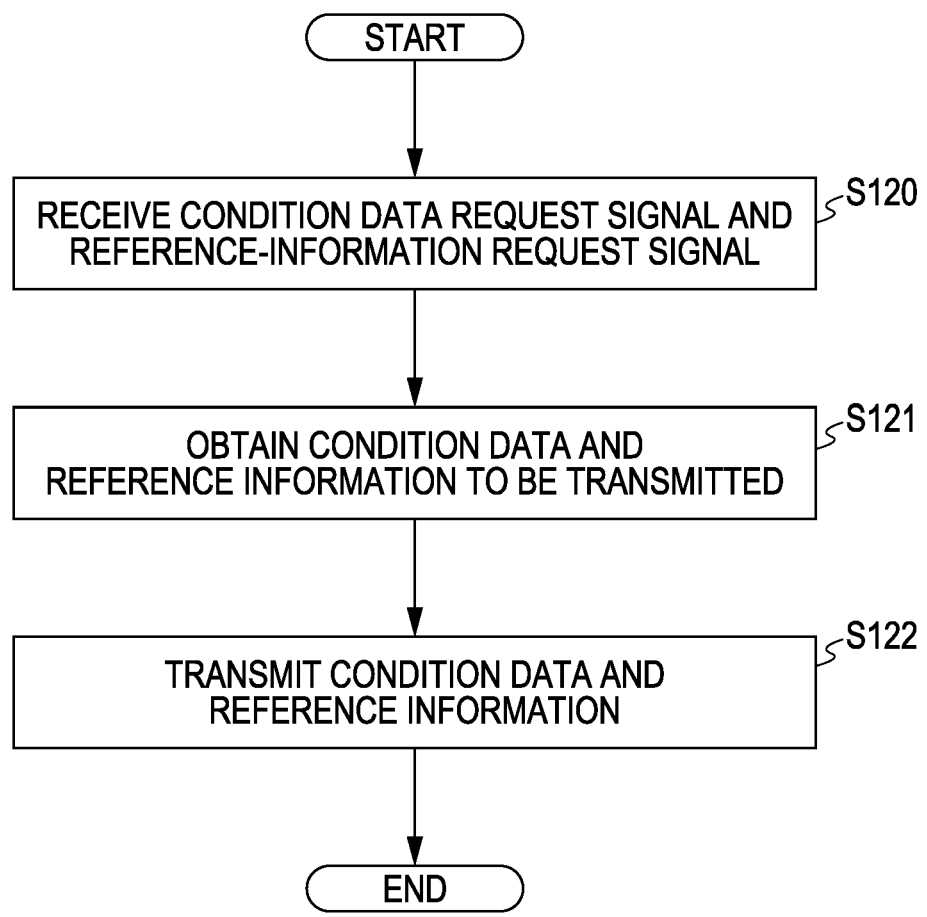

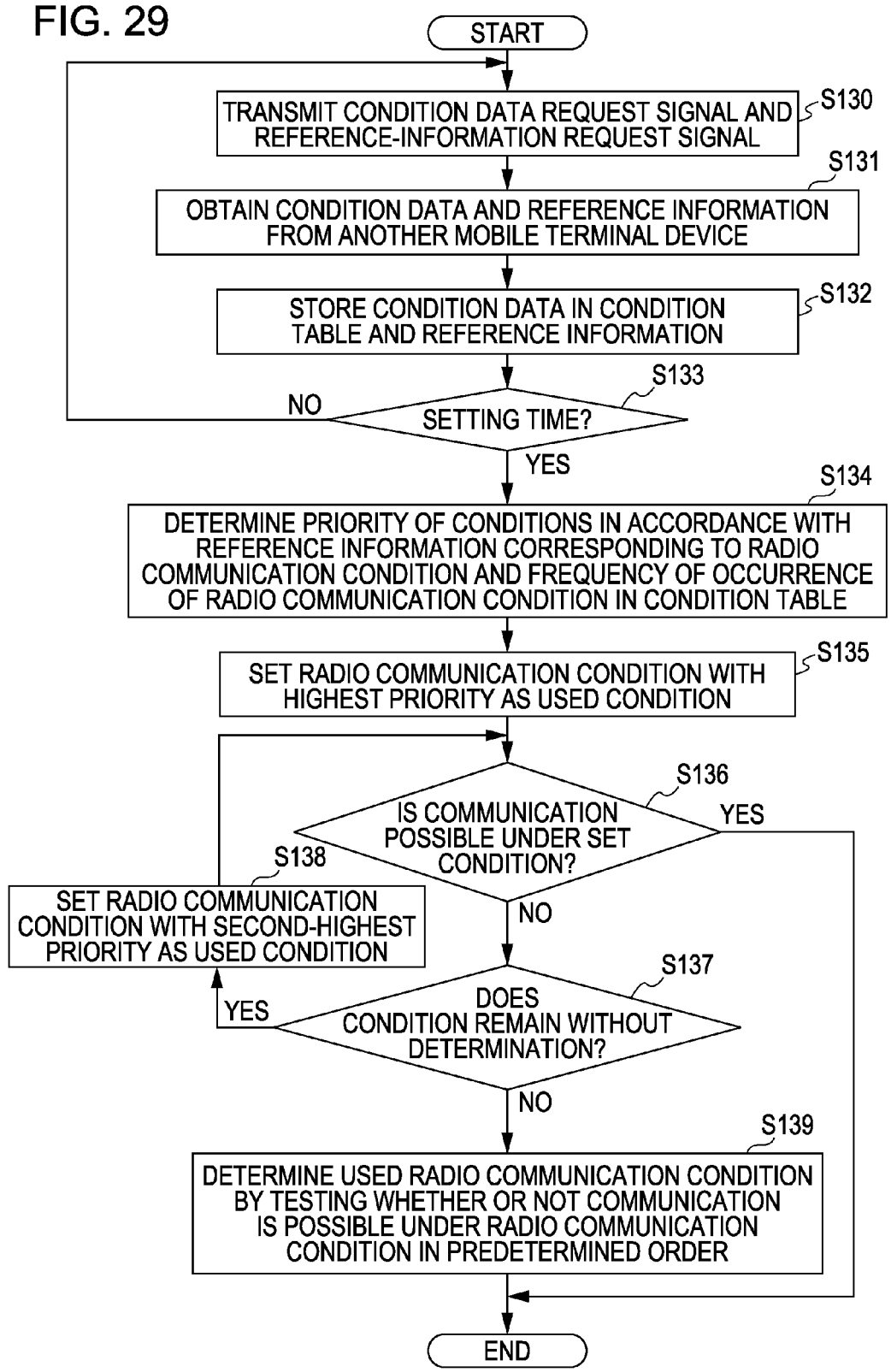

MOBILE TERMINAL DEVICE

CROSS-REFERENCE TO RELATED APPLICATION

This application is based upon and claims the benefit of priority of the prior Japanese Patent Application No. 2008-284325, filed on Nov. 5, 2008, the entire contents of which are incorporated herein by reference.

FIELD

A certain aspect of the embodiments discussed herein relates to a technique of a mobile terminal device that may set a plurality of radio communication conditions.

BACKGROUND

Hitherto, a mobile terminal device such as a mobile phone has a function that a plurality of radio access technologies and a plurality of frequency bands can be used and the radio communication conditions are automatically switched between. In the present specification and attached drawings, the radio access technology is also referred to as "RAT" hereinafter. In the present specification and the attached diagrams, with regard to radio communication between the mobile terminal device and a base station, the RAT and the frequency band used as the condition for performing the radio communication, other conditions, and a combination thereof are also referred to as a "radio communication condition".

The switching between the radio communication conditions in the mobile terminal device is executed by: sequentially selecting a combination in a predetermined order from various previously stored combinations of the RATs and the frequency bands; determining whether or not the radio communication can be performed with the base station on the basis of the selected combination; and setting a combination that can communicate with the base station as the RAT and the frequency band to be used.

When a power source of the mobile terminal device is OFF, the currently set RAT and frequency band are stored in a predetermined storage unit. When the power source is ON again, it is first determined whether or not the radio communication can be performed with the base station on the basis of the previously-stored RAT and frequency band.

It is disclosed that communication units of TDMA, CDMA, and FDMA are provided for mobile equipment and a radio base station. Further, the CDMA communication unit has: a channel coder for primary-modulating a transmission signal; a spreading code generator for generating different spreading codes; a clock generator/controller for controlling the generation of a chip clock and controlling the formation of the spreading code; an oscillator for setting different transmission frequencies to an output calculated by multiplication; and a central control unit for integrating and controlling various constructions and controlling allocation of a CDMA signal or a TDMA signal to an arbitrary time slot transmitted from the TDMA communication unit. The CDMA communication unit transmits mixed signals with different access systems at each time slot in the same frame.

Further, it is disclosed that a radio device that can be applied to a cellular mobile communication system having at least partly overlapped service areas of a plurality of communication systems as different communication systems includes: a radio unit that transmits and receives a radio signal; a storage device that stores a plurality of system modules having, as software modules, functions of signal processing of transmission and reception for a communication system as an application target; a resource that processes signals transmitted and received via the radio unit, temporarily stores a system module corresponding to a specific radio communication system assigned by transmission from the storage device, and executes signal processing corresponding to the stored system module; and a controller 12 having a manager that controls management to assign, to the resource, the system module corresponding to a used communication system in the system modules stored in the storage device, and controls an operation to assign, to the resource, the system module corresponding to the communication system as the handover destination as well as the system module in the communication system that is currently used when a handover condition is satisfied in the overlapped service of a plurality of types of the communication systems.

Furthermore, a radio communication terminal is disclosed to have: a radio unit that can communicate data via a plurality of radio communication systems; and a control unit that transmits a signal for reducing the amount of sequentially transmittable data transmitted from the transmitting side upon switching from the system to a system with maximal-throughput lower than that of the system during the data communication via one system of the plurality of radio communication systems.

In addition, a radio machine is disclosed to have: characteristic-data calculating means that calculates characteristic data on an electrical-wave propagation environment; resource measuring means; optimal-process selecting means that calculates the quality of service (QoS) and selects a combination of software processing or logical connection for obtaining a preferable QoS on the basis of the characteristic data and a usage situation of resources; software module adding means; and control means of module release.

[Patent Document 1] Japanese Laid-open Patent Publication No. 8-130766

[Patent Document 2] Japanese Laid-open Patent Publication No. 2002-291011

[Patent Document 3] Japanese Laid-open Patent Publication No. 2006-180412

[Patent Document 4] Japanese Laid-open Patent Publication No. 2002-252580

SUMMARY

According to an aspect of an embodiment, a mobile terminal device for communication with other terminal devices via one of a plurality of base stations, at least one of the base stations using a radio access technology different from that of at least one other base station, the mobile terminal device includes: a capturing unit for capturing a radio communication signal transmitted from another mobile terminal device in proximity to the mobile terminal device to determine the radio access technology that said another mobile terminal device is using; a processor for controlling to communicate with one of the other terminal devices in accordance with a process including: determining priority of which of the radio access technologies is sought to be available in accordance with the captured radio communication signal; seeking one of the radio access technologies currently available in the order of the priority; setting up a radio communication condition using one of the radio access technologies sought out, for communication with one of the base stations; and initiating communication with one of the other terminal devices via said one of the base stations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a first example of the data structure of a condition table.

FIG. 4 is a diagram illustrating a first example of the condition table.

FIG. 10 is a diagram illustrating an example of the priority of RATs.

FIG. 11 is a diagram illustrating an example of a correspondence table of the RAT to a frequency band.

FIG. 12 is a flowchart illustrating frequency band setting processing illustrated in FIG. 8.

FIGS. 13A, 13B and 13C are diagrams illustrating the priority between frequency bands available in GSM, WCDMA, and LTE.

FIG. 14 is a diagram illustrating the total frequencies for the RATs in the condition table illustrated in FIG. 4.

FIG. 15 is a diagram illustrating a result of determining the priority in the table illustrated in FIG. 4 prior to the frequency of the RAT.

FIG. 16 is a diagram illustrating a second example of the condition table.

FIG. 19 is a diagram illustrating a third example of the condition table.

FIG. 21 is a diagram illustrating an example of the priority of frequency bands.

FIG. 22 is a flowchart illustrating a sixth example of the disclosed setting method of the radio communication condition.

FIG. 23 is a diagram illustrating a second example of the data structure of the condition table.

FIG. 24 is a diagram illustrating a fourth example of the condition table.

FIG. 25 is a diagram illustrating an example of a priority reference table.

FIG. 26 is a diagram illustrating a second example of the priority of radio communication conditions.

FIG. 28 is a second example of an operating flowchart of the mobile terminal device that receives a condition data request signal.

FIG. 29 is a flowchart illustrating an eighth flowchart of the disclosed setting method of the radio communication condition.

DESCRIPTION OF EMBODIMENTS

Figure 1:
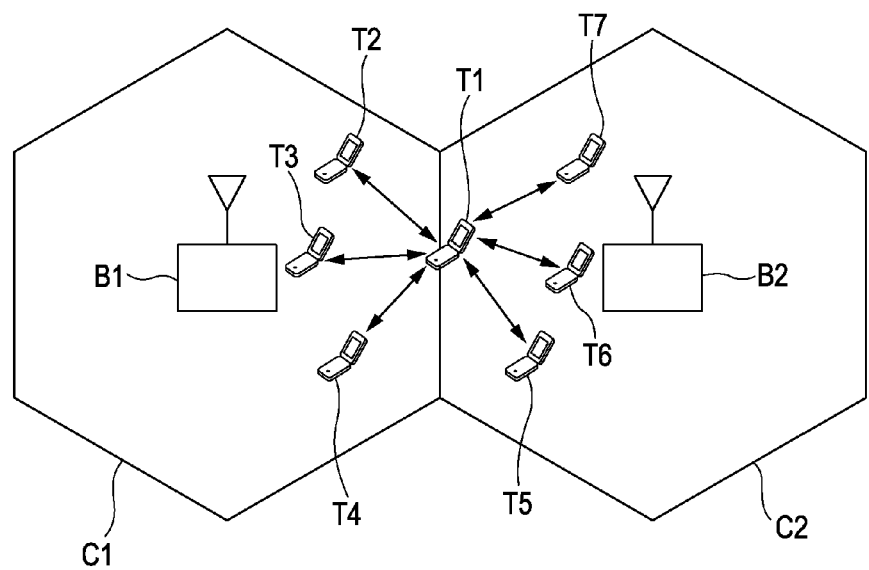
FIG. 1 is a diagram illustrating the entire structure of a disclosed communication system.

Hereinbelow, a description will be given of an embodiment with reference to the drawings. FIG. 1 is a diagram illustrating the entire structure of a disclosed communication system. A communication system 1 includes: a plurality of mobile terminal devices T1 to T7; and a plurality of base stations B1 and B2 that perform radio communication with the mobile terminal devices T1 to T7. In an example illustrated in the drawing, the base station B1 covers an area C1, and the base station B2 covers an area C2.

The mobile terminal devices T1 to T7 may be any type of devices having a function of radio communication with the base stations B1 and B2. For example, the mobile terminal devices T1 to T7 may be cellular phones, mobile information terminal devices, i.e., PDAs: Personal Digital Assistants, or personal computers. The base stations B1 and B2 perform radio communication with the mobile terminal devices T1 to T7 under radio communication conditions determined by the mobile terminal devices T1 to T7.

Figure 2:
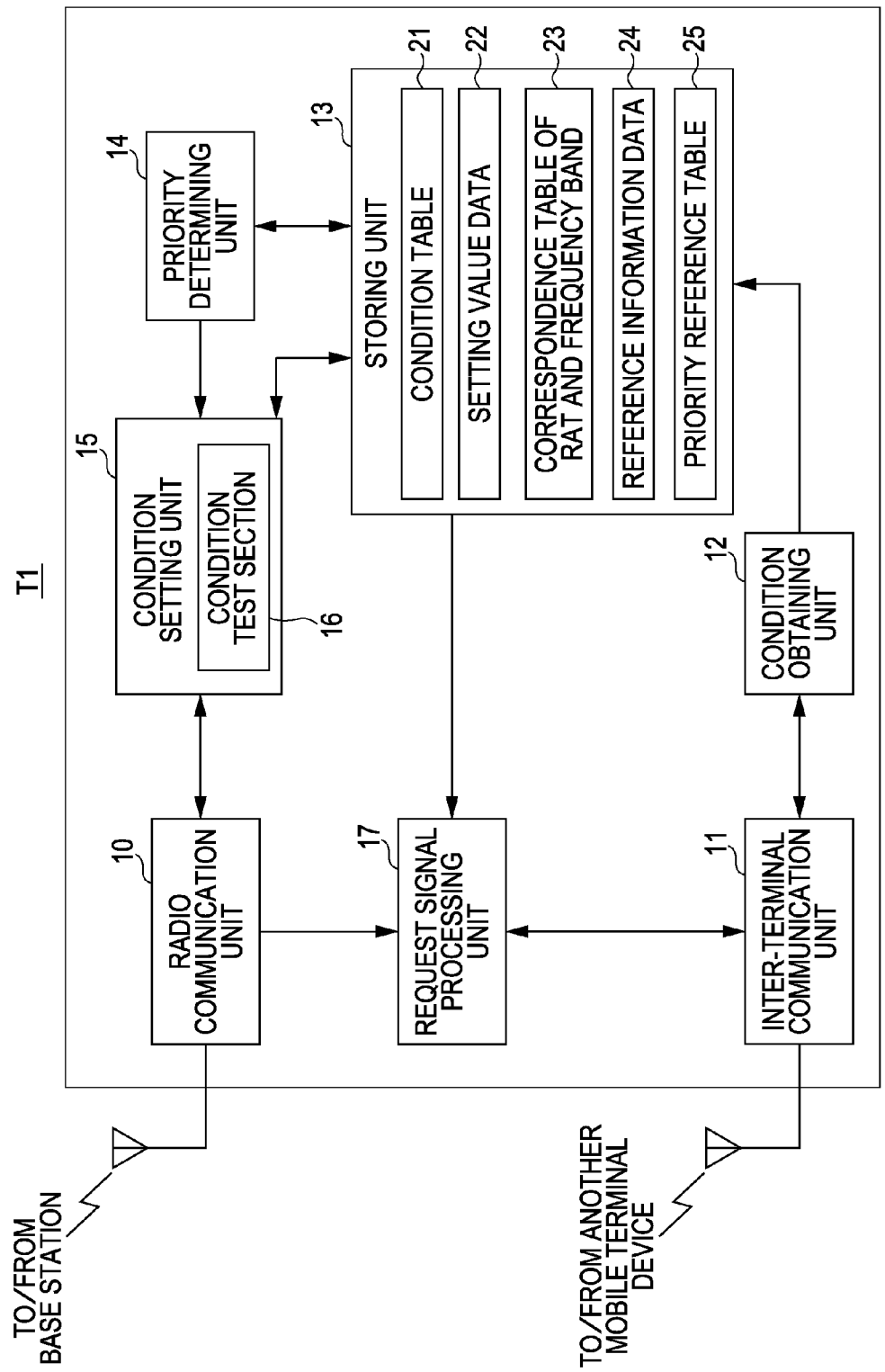
FIG. 2 is a diagram schematically illustrating a disclosed mobile terminal device.

FIG. 2 is a diagram schematically illustrating the structure of the disclosed mobile terminal device T1. Other mobile terminal devices T2 to T7 have the same structure as that of the device T1. The mobile terminal device T1 includes: a radio communication unit 10; an inter-terminal communication unit 11; a condition obtaining unit 12; a storing unit 13; a priority determining unit 14; a condition setting unit 15; and a request signal processing unit 17.

The radio communication unit 10 realizes a radio communication function between the mobile terminal device T1 and the base stations B1 and B2. The inter-terminal communication unit 11 realizes a communication function between the mobile terminal device T1 and other mobile terminal devices T2 to T7 near the mobile terminal device T1. The inter-terminal communication unit 11 may realize a radio communication function between the terminals with a radio communication technology used for wireless LAN or Bluetooth (registered trademark).

The condition obtaining unit 12 in the mobile terminal device T1 transmits a condition data request signal for requesting transmission of condition data as information on the radio communication condition such as RAT or a frequency band to other mobile terminal devices T2 to T7 via a communication line realized by the inter-terminal communication unit 11. In response to the condition data request signal, the condition obtaining unit 12 receives and obtains the condition data transmitted by other mobile terminal devices T2 to T7 via the communication line realized by the inter-terminal communication unit 11.

The radio communication condition is used for radio communication with the base stations B1 and B2 by using the mobile terminal device T1. According to the embodiment, as an example of the radio communication condition, any of the RAT, the frequency band, and the combination thereof are illustrated. Alternatively, as the radio communication condition, another condition such as a modulation system or error correction system may be used.

The storing unit 13 may be an operation system or operating program for operating the mobile terminal device T1, or any of a ROM, a RAM, and another storage device for storing data for the operation. A condition table 21 stored in the storing unit 13 stores a radio communication condition indicated by the condition data obtained by the condition obtaining unit 12 and the individual frequency of occurrence of the radio communication conditions obtained by the condition obtaining unit 12. Contents on information stored in the condition table 21 will be described later.

The priority determining unit 14 determines the priority of the radio communication conditions stored in the condition table 21. The condition setting unit 15 determines, in order of the priority determined by the priority determining unit 14, whether or not the communication with the base station B1 or B2 is possible depending on the radio communication conditions stored in the condition table 21. Upon finding the radio communication condition that is determined that communication with the base station B1 or B2 is possible, the condition setting unit 15 sets the radio communication condition as that used for the radio communication with the base station B1 or B2 using the radio communication unit 10. The condition setting unit 15 has a condition check section 16 that determines whether or not the communication with the base station B1 or B2 is possible in order of the priority determined by the priority determining unit 14 depending on the radio communication conditions stored in the condition table 21.

The request signal processing unit 17 receives the condition data request signal transmitted from any of other mobile terminal devices T2 to T7 via the communication line realized by the inter-terminal communication unit 11. Upon receiving the condition data request signal, the request signal processing unit 17 obtains the radio communication condition.

The request signal processing unit 17 may obtain, from the radio communication unit 10, the radio communication condition currently set as the radio communication condition used by the radio communication unit 10. When the radio communication condition used by the radio communication unit 10 is stored as setting value data 22 in the storing unit 13, the request signal processing unit 17 may read out the radio communication condition from the setting value data 22 stored in the storing unit 13.

Further, the request signal processing unit 17 may read out, as the condition data, the radio communication condition indicated by the condition data obtained by the condition obtaining unit 12 and the frequency of occurrence of the radio communication condition obtained by the condition obtaining unit 12 stored in the condition table 21. The request signal processing unit 17 transmits the obtained condition data to another mobile terminal device that transmits the condition data request signal.

FIG. 3 is a diagram illustrating a first example of the data structure of the condition table 21. The condition table 21 has a "used RAT" field, a "used frequency band" field, and a "frequency" field. The data structure of the condition table 21 in the example corresponds to the case in which the radio communication condition set by the condition setting unit 15 includes a combination of the RAT and the frequency band. A pair of the RAT and the frequency band included in the radio communication condition are stored in the "used RAT" field and the "used frequency band" field.

The "frequency" field stores a frequency of occurrence of the radio communication condition specified by values of the "used RAT" field and the "used frequency band" field in the condition data obtained by the condition obtaining unit 12. When the mobile terminal device that receives the condition data request signal transmits, as the condition data, the currently set condition as the radio communication condition used in the mobile terminal device, the "frequency" field stores the total number of times that the radio communication condition is received from another mobile terminal device.

When the condition obtaining unit 12 receives a radio communication condition from another mobile terminal device, if a record of the received radio communication condition is not included in the condition table 21, a new record is created in the condition table 21. The RAT and the frequency band indicating the received radio communication condition are stored in the "used RAT" field and "used frequency band" field. Then, the value of the "frequency" field is set to "1". When a record of the received radio communication condition already exists in the condition table 21, the condition obtaining unit 12 increases the value of the "frequency" field of the record by one.

FIG. 4 is a diagram illustrating a first example of the condition table 21. In the example illustrated in FIG. 4, the condition table 21 indicates that the number of times that the radio communication condition of the RAT being GSM and the used frequency band being f10 [GHz] has been received "3" times from another mobile terminal device and the radio communication condition of the RAT being WCDMA and the used frequency band being f14 [GHz] has been received "7" times from another mobile terminal device.

Further, when the mobile terminal device that receives the condition data request signal transmits, as the condition data, the radio communication condition and the frequency of occurrence thereof stored in the condition table 21 of the terminal, the "frequency" field stores all the values of the received frequencies of occurrence of various radio communication conditions.

When the condition obtaining unit 12 receives, as the condition data, the radio communication conditions and the frequencies of occurrence thereof stored in the table 21 of the terminal from another mobile terminal device, if the condition table 21 does not include a record of an obtained radio communication condition, a new record of the condition table 21 is created and the RAT and the frequency band indicating the obtained radio communication condition are stored in the "used RAT" field and the "used frequency band" field. Further, the value of the received frequency of occurrence of the radio communication condition is stored in the "frequency" field of the newly created record. When the condition table 21 already includes a record of the received radio communication condition, the condition obtaining unit 12 increases the value of the "frequency" field of the record by a value of the received frequency of occurrence of occurrence.

In the example illustrated in FIG. 4, the condition table 21 indicates that that the number of times that the radio communication condition of the RAT being GSM and the used frequency band being f10 [GHz] has been received "3" times from another mobile terminal device and the radio communication condition of the RAT I being WCDMA and the used frequency band being f14 [GHz] has been received "7" times from another mobile terminal device.

Figure 5:
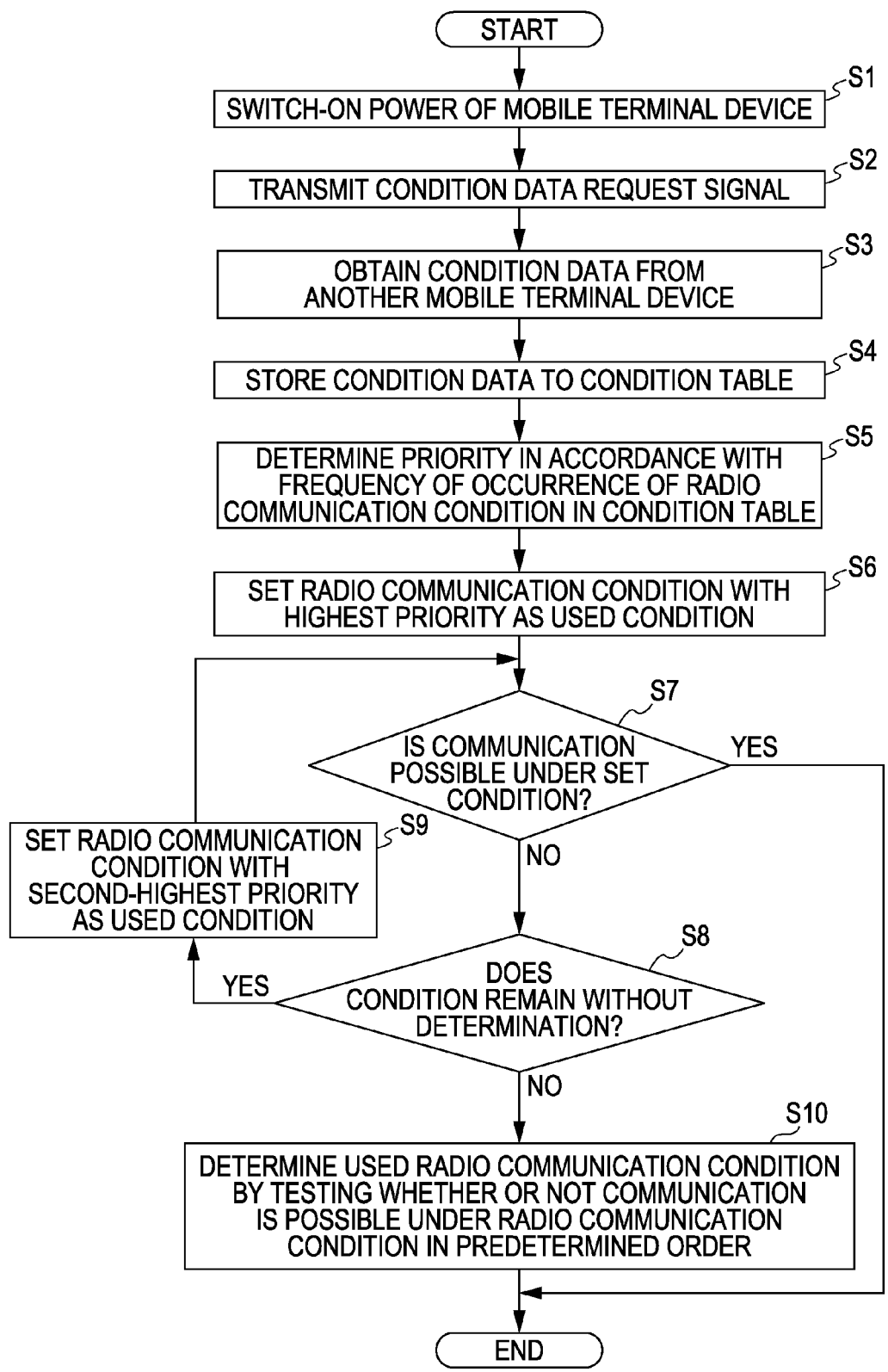
FIG. 5 is a flowchart illustrating a first example of a disclosed setting method of a radio communication condition.

FIG. 5 is a flowchart illustrating a first example of a disclosed setting method of the radio communication condition. The flowchart indicates a method for setting the radio communication condition when the power of the mobile terminal device T1 is ON. When the power of the mobile terminal device T1 is ON in step S1, in step S2, the condition obtaining unit 12 transmits the condition data request signal via the communication line realized by the inter-terminal communication unit 11.

Figures 6, 7:
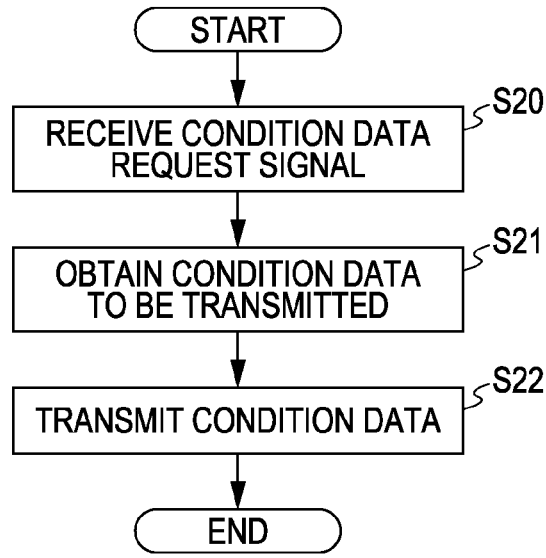
FIG. 6 is a first example of an operating flowchart of a mobile terminal device that receives a condition data request signal.
FIG. 7 is a diagram illustrating a first example of the priority of the radio communication conditions.

FIG. 6 is a first example of an operating flowchart of another mobile terminal device T2 that receives the condition data request signal. Other mobile terminal devices T3 to T7 that receive the condition data request signal perform similar processing. When the mobile terminal device T2 receives the condition data request signal transmitted from the mobile terminal device T1 in step S20, in step S21, the request signal processing unit 17 obtains the condition data to be transmitted to the mobile terminal device T1. The request signal processing unit 17 may obtain the radio communication condition currently set as a condition used by the radio communication unit 10 from the radio communication unit 10 in the mobile terminal device T2.

When the radio communication condition used by the radio communication unit 10 is stored in the storing unit 13, as the setting value data 22, the request signal processing unit 17 may read out the radio communication condition from the setting value data 22 stored in the storing unit 13. Further, the request signal processing unit 17 may read out the radio communication conditions and the frequencies of the radio communication conditions stored in the condition table 21 in the mobile terminal device T2, as the condition data. In step S22, the request signal processing unit 17 in the mobile terminal device T2 transmits the obtained condition data to the mobile terminal device T1 that transmits the condition data request signal.

Referring back to FIG. 5, in step S3, the condition obtaining unit 12 in the mobile terminal device T1 receives the condition data transmitted from another mobile terminal device T2. In step S4, the condition obtaining unit 12 stores the received condition data to the condition table 21. When other mobile terminals T2 to T7 that receive the condition data request signal transmit a condition currently set as the radio communication condition used by the mobile terminal device, as the condition data, the condition obtaining unit 12 stores the condition data in the condition table 21 through the following processing.

The condition obtaining unit 12 in the mobile terminal device T1 determines whether or not the condition table 21 includes a record of the received radio communication condition. When the condition table 21 does not include a record of the received communication condition, the condition obtaining unit 12 in the mobile terminal device T1 creates a new record in the condition table 21, and stores the RAT and the frequency band indicating the received radio communication condition in the "used RAT" field and the "used frequency band" field. Further, the value of the "frequency" field is set to "1". When the condition table 21 already includes a record of the received radio communication condition, the condition obtaining unit 12 increases the value of the "frequency" field by one.

When other mobile terminal devices T2 to T7 that receive the condition data request signal transmit, as the condition data, the radio communication conditions and the frequencies of occurrence of the radio communication conditions stored in the condition table 21, the condition obtaining unit 12 stores the condition data in the condition table 21 through the following processing.

When the condition obtaining unit 12 in the mobile terminal device T1 receives, as the condition data, the radio communication conditions and the frequencies thereof stored in the table 21 in the terminal from other mobile terminal devices T2 to T7, it is determined whether or not the condition table 21 includes records of the obtained radio communication conditions. When the condition table 21 does not include a record of an obtained radio communication condition, the condition obtaining unit 12 additionally creates a record of the condition table 21, and stores the RAT and the frequency band indicating the obtained radio communication condition in the "used RAT" field and the "used frequency band" field. Then, the value of the frequency of occurrence of the radio communication condition is stored in the "frequency" field of the additionally-created record. When the condition table 21 already includes a record of the received radio communication condition, the condition obtaining unit 12 increases the value of the "frequency" field of the record by the value of the received frequency of occurrence.

In step S5, the priority determining unit 14 determines the priority of the radio communication conditions stored in the condition table 21. FIG. 7 is a diagram illustrating a first example of the priority of the radio communication conditions. In the example, the priority determining unit 14 sets the priority of the radio communication conditions as the combination of the RAT and the frequency band in accordance with the frequency of occurrence of the radio communication conditions.

As illustrated in FIG. 7, a high priority is indicated by a low value. As illustrated in the drawing, the maximum value of the frequency is "25" and the highest value of the priority is "1" under the radio communication condition indicating that the RAT is WCDMA and the frequency band is f4 [GHz]. Further, the highest value of the frequency is "0" and the maximum value of the priority is "18" under the radio communication condition indicating that the RAT is GSM and the frequency band is f3 [GHz].

In step S6, the condition check section 16 in the condition setting unit 15 sets the radio communication condition having the highest priority determined by the priority determining unit 14 as a condition used in the radio communication of the radio communication unit 10. In step S7, the condition check section 16 determines whether or not the radio communication unit 10 can communicate with the base station under the set radio communication condition.

When it is determined in step S7 that communication with the base station is not possible under the set radio communication condition, the processing ends. As a consequence thereof, the radio communication condition set in the determination in step S7 is set as the radio communication condition that is thereafter used by the mobile terminal device T1. The condition check section 16 may set the currently set radio communication condition as the setting value data 22 and then may store the condition in the storing unit 13.

When it is determined in step S7 that communication with the base station is not possible under the set radio communication condition, the processing advances to step S8. In step S8, the condition check section 16 determines whether or not the radio communication condition stored in the condition table 21 remains without the determination in step S7 as to whether or not communication with the base station is possible.

When the radio communication condition without the determination remains, in step S9, the condition check section 16 sets the radio communication condition of the second-highest priority of that of the radio communication conditions determined just before step S7 as a condition to be used in the radio communication of the radio communication unit 10, and the processing returns to step S7.

When it is determined in step S8 that the radio communication condition without the determination remains, in step S10, the condition check section 16 sets the radio communication conditions usable by the mobile terminal device T1 as conditions to be used in the radio communication of the radio communication unit 10 in a predetermined order. The condition check section 16 determines whether or not the radio communication unit 10 can communicate with the base station under the sequentially set radio communication conditions, and sets the radio communication condition under which communication is possible, as the radio communication condition thereafter-used by the mobile terminal device T1.

Figure 8:
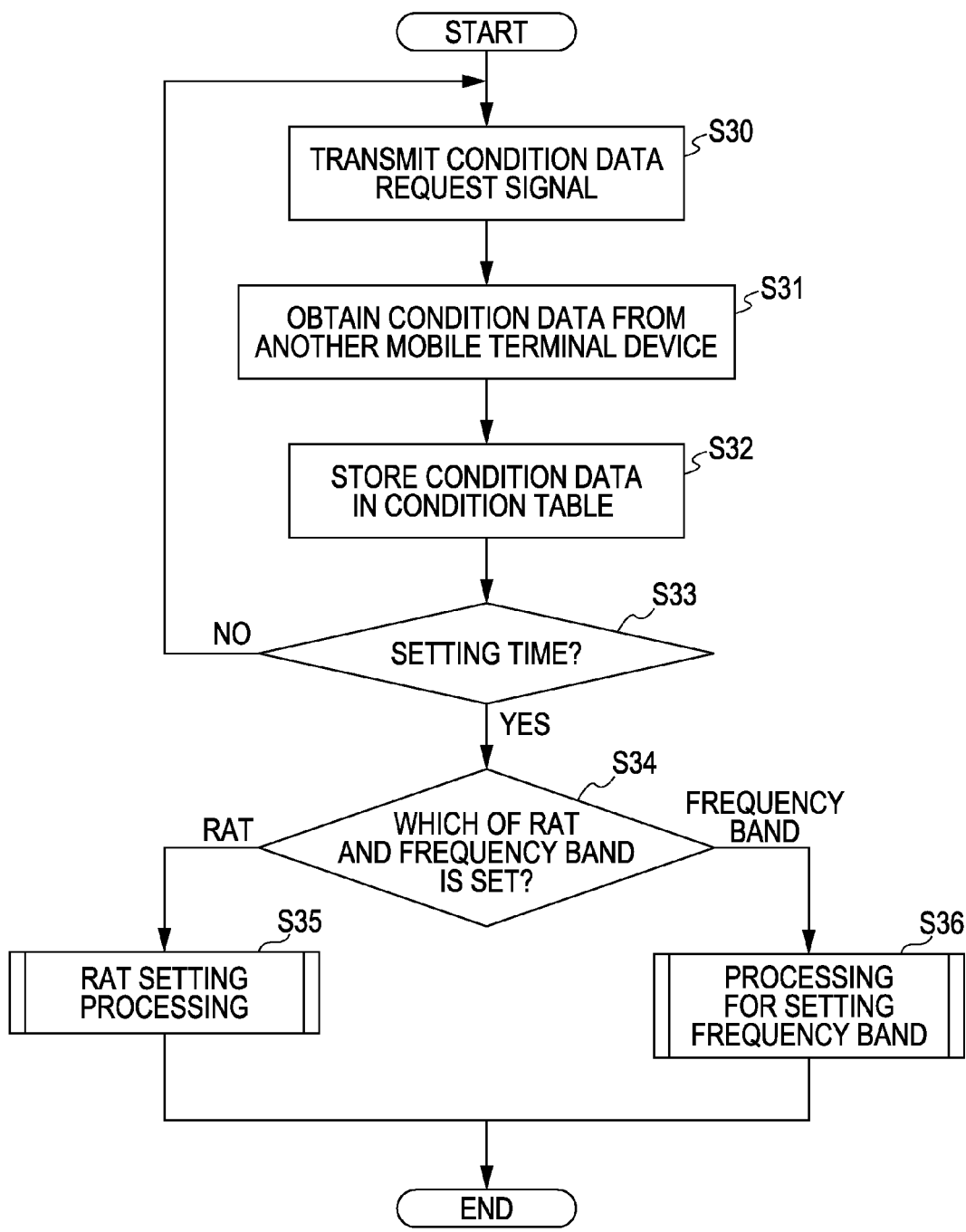
FIG. 8 is a flowchart illustrating a second example of a disclosed setting method of the radio communication condition.

FIG. 8 is a flowchart illustrating a second example of the disclosed setting method of the radio communication condition. The flowchart indicates a method for periodically setting the radio communication condition by the mobile terminal device T1. In steps S30 to S32, similarly to steps S2 to S4 illustrated in FIG. 5, the condition data is obtained from other mobile terminal devices T2 to T7, and the radio communication condition indicated by the obtained condition data is stored in the condition table 21.

In step S33, the condition setting unit 15 determines whether or not it is time to change the setting for the used RAT or frequency band. For example, the condition setting unit 15 may be programmed to change the setting of the RAT or frequency band for a predetermined period. When it is not time to change the setting of the used RAT or frequency band, the processing returns to step S30. The mobile terminal device T1 iteratively executes the processing in steps S30 to S33 for a predetermined period.

When it is determined in step S33 that it is time to change the setting of the used RAT or frequency band, the processing advances to step S34. In step S34, the condition setting unit 15 determines whether the RAT or frequency band is set. The condition setting unit 15 may determine that the RAT is set two times out of three times and the frequency band is set once out of three times. As mentioned above, the condition setting unit 15 may determine the setting of any of the RAT and the frequency band by a rate of a predetermined frequency. The condition setting unit 15 may determine the setting of either of the RAT and the frequency band on the basis of the setting performed in advance by the user.

Figure 9:
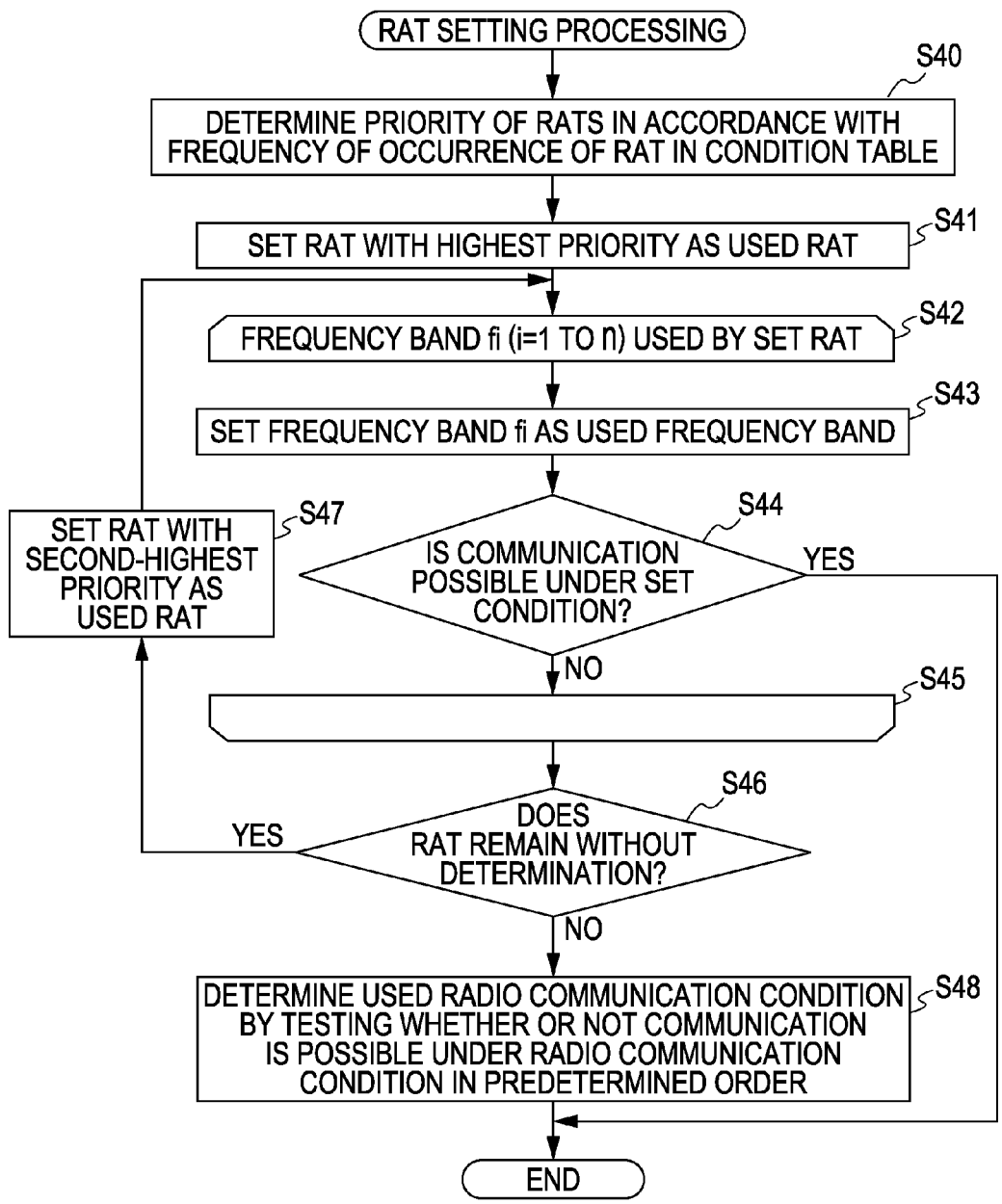
FIG. 9 is a flowchart illustrating RAT setting processing illustrated in FIG. 8.

When it is determined in step S34 that the RAT is set, the processing advances to step S35. FIG. 9 is a flowchart illustrating RAT setting processing S35 illustrated in FIG. 8. In step S40, the priority determining unit 14 determines the priority of the RATs in accordance with the total value of the frequencies of the RATs in the condition table 21 illustrated in FIG. 4. FIG. 10 illustrates the frequency and the priority of GSM, WCDMA, and LTE as the RATs.

In step S41 in FIG. 9, the condition check section 16 in the condition setting unit 15 sets the RAT with the highest priority determined by the priority determining unit 14 as the RAT used in the radio communication of the radio communication unit 10. Thereafter, the condition check section 16 reads a correspondence table 23 of the RAT and the frequency band stored in the storing unit 13, and obtains a frequency band fi (i=1 to n) usable by the mobile terminal device T1 for the currently set RAT, as the frequency band used by the radio communication unit 10.

FIG. 11 is a diagram illustrating an example of the correspondence table 23 of the RAT and the frequency band. As illustrated in the drawing, the RAT usable by the mobile terminal device T1 and the frequency band available upon using the RATs are registered in advance in the correspondence table 23 of the RAT and the frequency band. The condition check section 16 repeats a loop including steps S42 to S45 for the obtained frequency band fi (i=1 to n).

In step S43, the condition check section 16 sets the frequency band fi as the frequency band used in the radio communication of the radio communication unit 10. In step S44, the condition check section 16 determines whether or not the radio communication unit 10 can communicate with the base station by using the set RAT and frequency band.

When it is determined in step S44 that communication with the base station is possible for the set RAT and frequency band, the processing ends. As a consequence thereof, the RAT and the frequency band set in the determination in step S44 are set as the radio communication condition thereafter-used by the mobile terminal device T1. The condition check section 16 may store the currently set RAT and frequency band as the setting value data 22 in the storing unit 13. When it is determined in step S44 that communication with the base station is not possible for the set RAT and frequency band, the processing returns to step S42.

When it is determined in step S44 that communication with the base station is not possible for all the frequency bands fi (i=1 to n) usable by the currently set RAT used by the radio communication unit 10, the processing reaches to step S46 after a loop including steps S42 to S45. In step S46, the condition check section 16 determines whether or not the condition of the RAT stored in the condition table 21 remains without the determination as whether or not communication with the base station in step S44 is possible.

When the RAT without the determination remains, in step S47, the condition check section 16 sets the RAT of the second priority of that of the RAT with the determination in just before step S44, as the used RAT, in the radio communication of the radio communication unit 10, and the processing returns to step S42.

When it is determined in step S46 that the RAT does not remain without the determination, in step S48, the condition check section 16 sets the radio communication condition similarly to step S10 illustrated in FIG. 5.

When it is determined in step S34 in FIG. 8 that the frequency band is set, the processing advances to step S36. FIG. 12 is a flowchart illustrating processing S36 for setting the frequency band illustrated in FIG. 8. In step S50, the priority determining unit 14 determines the priority of frequency band usable by the currently used RAT. The priority determining unit 14 determines the priority of frequency band in accordance with the total value of the frequencies for the individual frequency bands in the condition table 21. FIGS. 13A, 13B and 13C are diagrams illustrating the priority of the frequency bands available upon using the GSM, WCDMA, and LTE.

In step S51, the condition check section 16 sets the frequency band with the highest priority determined by the priority determining unit 14, as the frequency band used in the radio communication of the radio communication unit 10. In step S52, the condition check section 16 determines, by using the set RAT and frequency band, whether or not the radio communication unit 10 can communicate with the base station.

When communication with the base station is possible for the set RAT and frequency band determined in step S52, the processing ends. As a consequence, the RAT and frequency band set in the determination in step S52 are set without change as the radio communication condition thereafter-used by the mobile terminal T1. The condition check section 16 may store the currently set RAT and frequency band as the setting value data 22 in the storing unit 13.

When it is determined in step S52 that communication with the base station is not possible for the set RAT and frequency band, the processing advances to step S53. In step S53, the condition check section 16 determines whether the condition for the frequency bands that can be used for the currently used RAT and are stored in the condition table 21 remains without the determination as whether or not communication with the base station in step S52 is possible.

When the frequency band without the determination remains, in step S54, the condition check section 16 sets the frequency band of the second priority of that of the frequency band determined in just before step S52 as the frequency band used in the radio communication of the radio communication unit 10, and the processing returns to step S52.

When it is determined in step S53 that the frequency band does not remain without the determination, in step S55, the condition test unit 16 sets the radio communication condition similarly to step S10 illustrated in FIG. 5.

The mobile terminal device T1 according to the embodiment obtains the radio communication condition from another mobile terminal device, and determines whether or not the condition is available to the radio communication with the base station, starting from the obtained radio communication condition, thereby determining the radio communication condition starting from the condition with higher availability. As compared with the conventional determining method, the radio communication condition is set extremely fast. That is, with the conventional method, since it is sequentially determined in a predetermined order whether or not the radio communication conditions are available, several tens sec are required in the worst case. However, with the present method, the setting can be completed for several hundreds msec.

Further, the determining order is determined in accordance with the priority based on the frequency of occurrence of the radio communication condition, thereby completing the setting faster.

Obviously, as for the method for determining the priority of the radio communication conditions with the priority determining unit 14 on the basis of the value stored in the "frequency" field in the condition table illustrated in FIG. 4, there is not limited to the above-mentioned method, and various methods can be used. For example, the priority determining unit 14 may determine the priority of the radio communication conditions as the combination of the RAT and the frequency band by putting a higher priority of the total value of the frequencies for the individual RATs as follows.

FIG. 14 is a diagram illustrating a result of aggregation of the frequencies for each RAT in the condition table illustrated in FIG. 4. As illustrated in FIG. 14, with respect to the WCDMA, LTE, and GSM as the RATs, the total values of the frequencies are "70", "24", and "21", respectively. In order of the WCDMA, LTE, and GSM, the frequency is higher.

FIG. 15 is a diagram illustrating a result of determining the priority in the table illustrated in FIG. 4 by putting the higher priority to the frequency of the RATs. The priority determining unit 14 sets the priority of the radio communication conditions using the WCDMA with the highest frequency to be higher than the radio communication condition using another RAT. Further, the priority determining unit 14 determines the priority of the radio communication condition using the LTE with the second-highest priority to be the second-highest priority of the radio communication conditions using the WCDMA. Further, the priority determining unit 14 determines the priority of the radio communication condition using the GSM with a lower frequency to be lower than the radio communication condition to use another RAT.

The priority determining unit 14 determines the priority of the radio communication conditions using the same RAT and different frequency bands depending on the scale of the frequencies stored in the condition table illustrated in FIG. 4.

FIG. 16 is a diagram illustrating a second example of the condition table 21. The condition table 21 has the "used RAT" field and the "frequency" field. The data structure of the condition table 21 in the example corresponds to the case in which the radio communication condition set by the condition setting unit 15 includes the RAT. The "used RAT" field stores the RAT included in the radio communication condition. The "frequency" field stores the frequency of the RAT specified by the value of the "used RAT" field, appearing in the condition data obtained by the condition obtaining unit 12.

Figure 17:
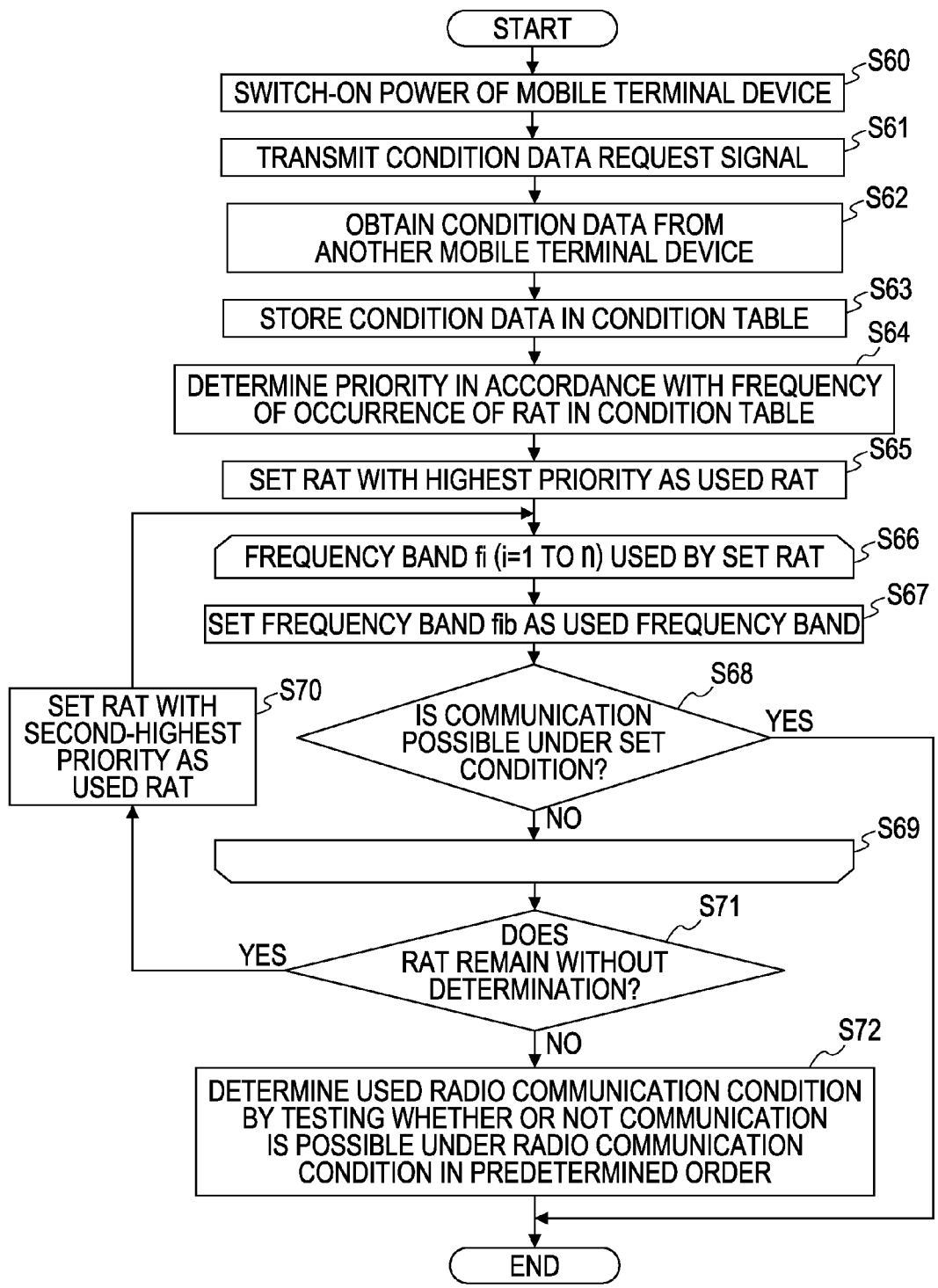
FIG. 17 is a flowchart illustrating a third example of the disclosed setting method of the radio communication condition.

FIG. 17 is a flowchart illustrating a third example of the disclosed setting method of the radio communication condition. The flowchart indicates a method for creating the condition table 21 illustrated in FIG. 16 and setting the radio communication condition when the power of the mobile terminal device T1 is ON. In step S60, the power of the mobile terminal device T1 is ON. In step S61, the condition obtaining unit 12 transmits the condition data request signal via the communication line realized by the inter-terminal communication unit 11.

In step S62, the condition obtaining unit 12 in the mobile terminal device T1 receives the condition data transmitted from other mobile terminal devices T2 to T7. In step S63, the condition obtaining unit 12 stores the received condition data in the condition table 21. The radio communication condition illustrated by the condition data obtained and stored in steps S3 and S4 in FIG. 5 includes the "RAT" and the "frequency band". On the other hand, excluding that the radio communication condition illustrated by the condition data obtained and stored in steps S62 and S63 includes the "RAT", the processing for obtaining and storing the condition data in steps S62 and S63 may be identical to the processing in steps S3 and S4 in FIG. 5. However, with respect to the condition data obtained and stored in steps S62 and S63, the radio communication condition may include the "RAT" and the "frequency band".

In step S64, the priority determining unit 14 determines the priority of the RATs stored in the condition table 21. The priority determining unit 14 sets the priority of the RATs in accordance with the frequency of the RATs. In step S65, the condition check section 16 sets the RAT with the highest priority determined by the priority determining unit 14 as the RAT used in the radio communication of the radio communication unit 10. Thereafter, the condition check section 16 reads the correspondence table 23 of the RAT and the frequency band, and obtains the frequency band fi (i=1 to n) available by the mobile terminal device T1 for the RAT currently set as the frequency band used by the radio communication unit 10. The condition check section 16 repeats a loop including steps S66 to S69 for the obtained frequency band fi (i=1 to n).

In step S67, the condition check section 16 sets the frequency band fi as the frequency band used in the radio communication of the radio communication unit 10. In step S68, the condition check section 16 determines whether or not the radio communication unit 10 can communicate with the base station by using the set RAT and frequency band.

When it is determined in step S68 that communication with the base station is possible for the set RAT and frequency band, the processing ends. As a consequence thereof, the RAT and frequency band set in the determination in step S68 are thereafter set as the radio communication condition used by the mobile terminal device T1. The condition check section 16 may store the currently set RAT and frequency band as the setting value data 22 in the storing unit 13. When it is determined in step S68 that communication with the base station is not possible for the set RAT and frequency band, the processing returns to step S66.

When it is determined in step S68 that communication with the base station is not possible for all the frequency bands fi (i=1 to n) usable by the currently set RAT used by the radio communication unit 10, the processing reaches step S71 after a loop including S66 to S69. In step S71, the condition check section 16 determines whether or not the condition for the RATs stored in the condition table 21 remains without the determination as whether or not communication with the base station in step S68 is possible.

When it is determined that the RAT remains without the determination, in step S70, the condition check section 16 sets the RAT with the second priority of that of the RAT determined in just before step S68 as the RAT used in the radio communication of the radio communication unit 10, and the processing returns to step S66. When it is determined in step S66 that the RAT does not remain without the determination, in step S72, the condition check section 16 sets the radio communication condition similarly to step S10 illustrated in FIG. 5.

Figure 18:
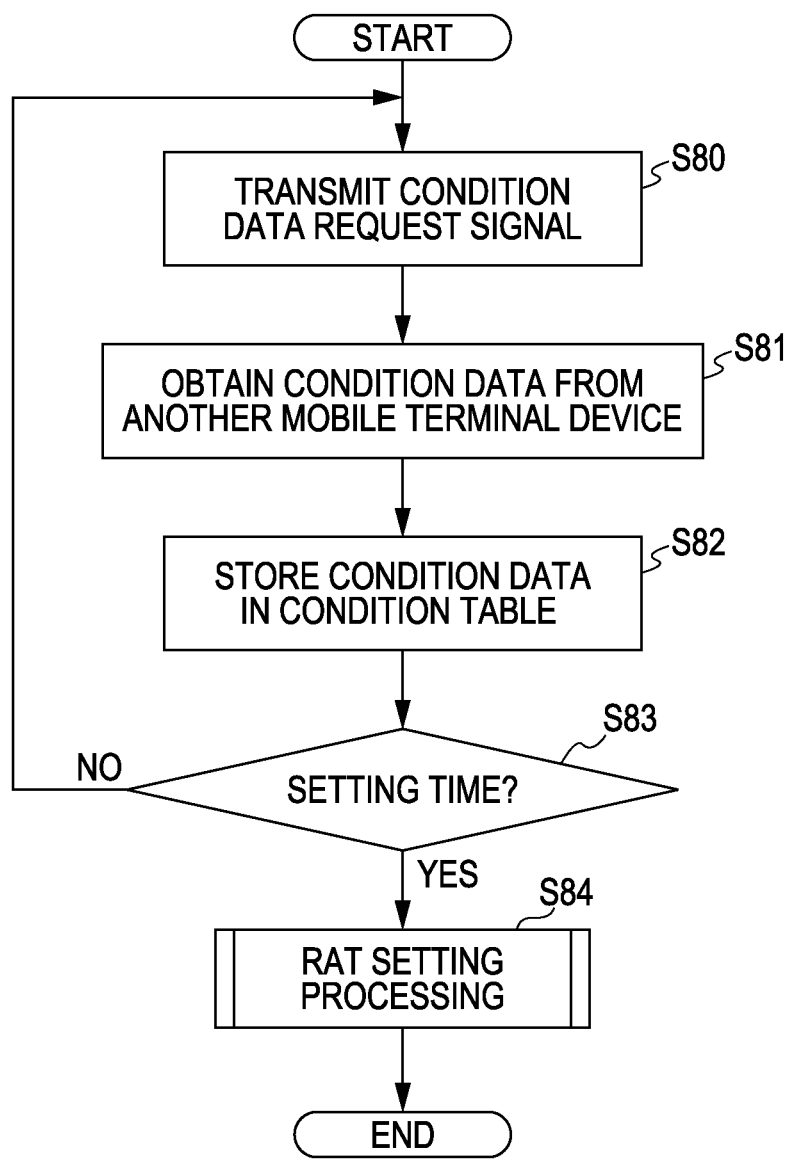
FIG. 18 is a flowchart illustrating a fourth example of the disclosed setting method of the radio communication condition.

FIG. 18 is a flowchart illustrating a fourth example of the disclosed setting method of the radio communication condition. The flowchart indicates a method for periodically creating the condition table 21 illustrated in FIG. 16 by the mobile terminal device T1 and setting the radio communication condition. In steps S80 to S82, similarly to steps S61 to S63 illustrated in FIG. 17, the condition data is obtained from other mobile terminal devices T2 to T7, and the radio communication condition indicated by the obtained condition data is stored in the condition table 21.

In step S83, the condition setting unit 15 determines whether or not it is time to change the setting of the used RAT. When it is time to change the setting of the used RAT, the processing returns to step S80. The mobile terminal device T1 iteratively executes the processing in steps S80 to step S83 for a predetermined period. When it is determined in step S83 that it is time to change the setting of the used RAT, the processing advances to step S84. In step S84, the RAT and the frequency band are set by the processing similar to the RAT setting processing S35 illustrated in FIG. 9.

FIG. 19 is a diagram illustrating a third example of the condition table 21. The condition table 21 has the "used frequency band" field and the "frequency" field. The data structure of the condition table 21 in the example corresponds to the case in which the radio communication condition set by the condition setting unit 15 includes the frequency band. The "used frequency band" field stores the frequency band included in the radio communication condition. The "frequency" field stores the frequency of the used frequency band specified by the value of the "used frequency band" field, appearing in the condition data obtained by the condition obtaining unit 12.

Figure 20:
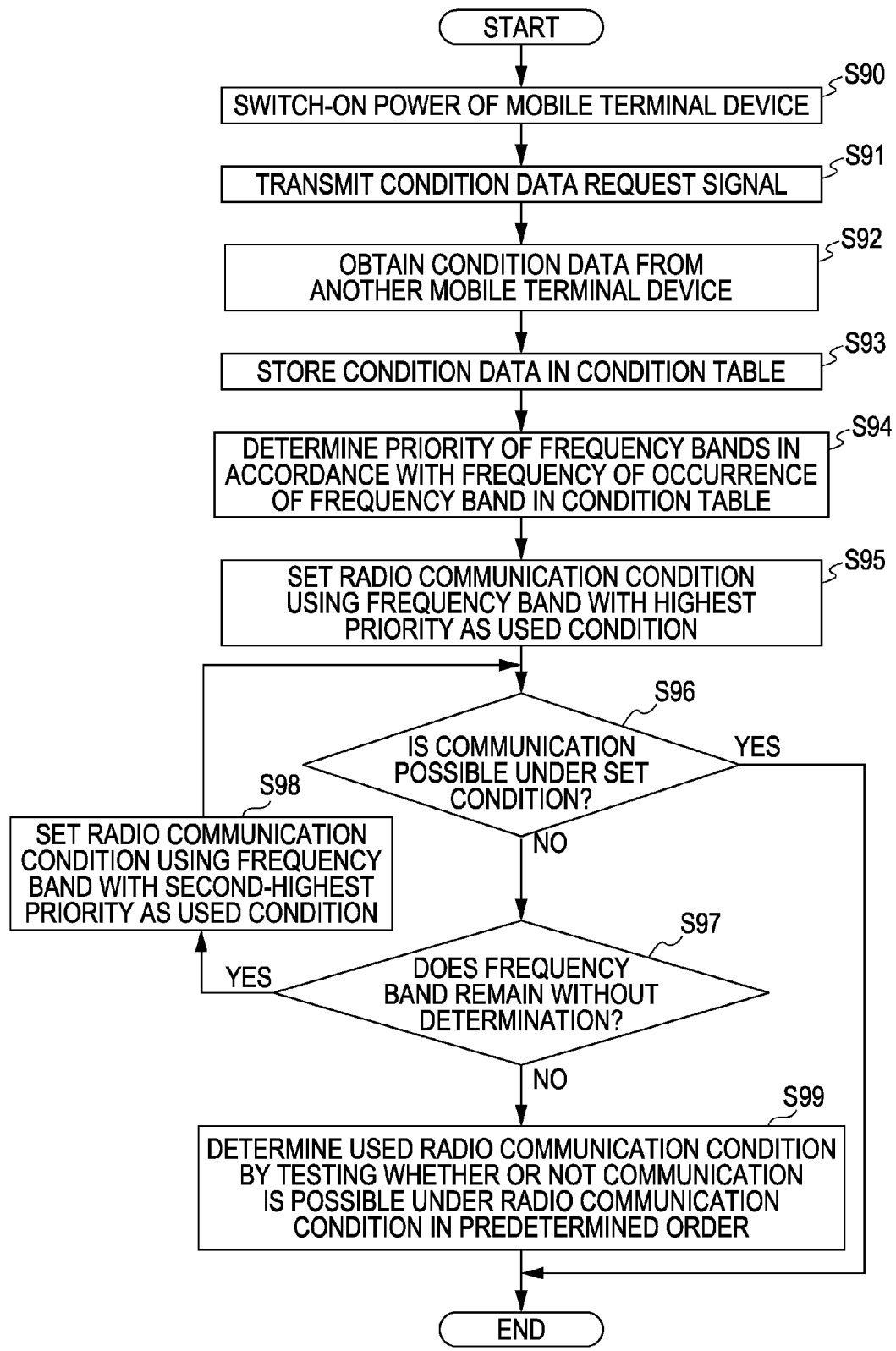
FIG. 20 is a flowchart illustrating a fifth example of the disclosed setting method of the radio communication condition.

FIG. 20 is a flowchart illustrating a fifth example of the disclosed setting method of the radio communication condition. The flowchart indicates a method for creating the condition table 21 illustrated in FIG. 19 and setting the radio communication condition when the power of the mobile terminal device T1 is ON. In step S90, the power of mobile terminal device T1 is ON. In step S91, the condition obtaining unit 12 transmits the condition data request signal via the communication line realized by the inter-terminal communication unit 11.

In step S92, the condition obtaining unit 12 in the mobile terminal device T1 receives the condition data transmitted from other mobile terminal devices T2 to T7. In step S93, the condition obtaining unit 12 stores the received condition data in the condition table 21. The radio communication condition indicated by the condition data obtained and stored in steps S3 and S4 illustrated in FIG. 5 includes the "RAT" and the "frequency band". On the other hand, excluding that the radio communication condition indicated by the condition data obtained and stored in steps S92 and S93 includes the "frequency band", processing for obtaining and storing the condition data in the processing in steps S92 and S93 may be similar to that illustrated in steps S3 and S4 illustrated in FIG. 5. However, also in the condition data obtained and stored in S92 and S93, the radio communication condition may include the "RAT" and the "frequency band".

In step S94, the priority determining unit 14 determines the priority of the frequency band stored in the condition table 21 illustrated in FIG. 19. The priority determining unit 14 determines the priority in accordance with the total value of the frequencies of the frequency bands in the condition table 21. FIG. 21 is a diagram illustrating the priority of the frequency bands.

In step S95, the condition check section 16 sets the frequency band with the highest priority determined by the priority determining unit 14 as the frequency band used in the radio communication of the radio communication unit 10. Further, the condition check section 16 determines the RAT using the frequency band on the basis of the correspondence table 23 of the RAT and the frequency band, and sets the determined RAT as the RAT used in the radio communication of the radio communication unit 10.

In step S96, the condition check section 16 determines whether or not the radio communication unit 10 can communicate with the base station by using the set RAT and frequency band.

When it is determined in step S96 that communication with the base station is possible for the set RAT and frequency band, the processing ends. As a consequence, the RAT and frequency band set in the determination in step S96 are thereafter set as the radio communication condition used by the mobile terminal device T1. The condition check section 16 may set the currently set RAT and frequency band as the setting value data 22 and then may store the set RAT and frequency band to the storing unit 13.

When it is determined in step S96 that it is not communication with the base station is possible for the set RAT and frequency band, the processing advances to step S97. In step S97, the condition check section 16 determines whether or not the condition for the frequency band stored in the condition table remains without the determination in step S96 as whether or not communication with the base station is possible.

When the frequency band without the determination remains, in step S98, the condition check section 16 sets, as the radio communication condition used in the radio communication of the radio communication unit 10, the frequency band with the second priority of that of the frequency band with the determination in just before step S96 and the RAT using the frequency band, and the processing returns to step S96.

When it is determined in step S97 that the frequency band without the determination does not remain, in step S99, the condition check section 16 sets the radio communication condition similarly to step S10 illustrated in FIG. 5.

FIG. 22 is a flowchart illustrating a sixth example of the disclosed setting method of the radio communication condition. The flowchart indicates a method for periodically creating the condition table 21 illustrated in FIG. 19 by the mobile terminal device T1 and setting the radio communication condition. In steps S100 to S102, similarly to steps S91 to S93 illustrated in FIG. 20, the condition data is obtained from other mobile terminal devices T2 to T7, and the radio communication condition indicated by the obtained condition data is stored in the condition table 21.

In step S103, the condition setting unit 15 determines whether or not it is time to change the setting of the used frequency band. When it is not time to change the setting of the used frequency band, the processing returns to step S100. The mobile terminal device T1 iteratively executes the processing in steps S100 to S103 for a predetermined period. When it is determined in step S103 that it is time to change the used RAT, the processing advances to step S104. In step S104, the RAT and the frequency band are set by the same processing as the frequency band setting processing S36 illustrated in FIG. 12.

According to another embodiment, which will be described hereinbelow, the condition obtaining unit 12 illustrated in FIG. 2 obtains predetermined reference information corresponding to the radio communication condition obtained as the condition data from other mobile terminal devices T2 to T7 in addition to the above-mentioned condition data. The reference information may be an identifier of a communication carrier that provides services for the RAT and frequency band obtained as the condition data. The condition obtaining unit 12 stores the obtained identifier of the communication carrier to reference information data 24. The condition obtaining unit 12 corresponds to reference-information obtaining means described in Claims.

The condition obtaining unit 12 transmits a reference information request signal for requesting the transmission of the reference information to other mobile terminal devices T2 to T7 via the communication line realized by the inter-terminal communication unit 11. Further, the condition obtaining unit 12 receives and obtains the reference information transmitted by other mobile terminal devices T2 to T7 via the communication line realized by the inter-terminal communication unit 11 in response to the reference information request signal. Other mobile terminal devices T2 to T7 may transmit the reference information, simultaneously with the condition data or as a part of the condition data. Other mobile terminal devices T2 to T7 may transmit the reference information upon receiving the condition data request signal.

The request signal processing unit 17 receives the reference information request signal transmitted from another mobile terminal device via the communication line realized by the inter-terminal communication unit 11. Upon receiving the condition data request signal, the request signal processing unit 17 obtains the reference information from the setting value data 22 stored in the storing unit 13 or the radio communication unit 10. The mobile terminal device T1 may store, as the setting value data 22, an identifier of a communication carrier for providing the services under the radio communication condition as information available as the reference information, an identifier of a vender of the mobile terminal device T1, an identifier of the type of the mobile terminal device T1, and an identifier of available services to the storing unit 13. The request signal processing unit 17 transmits the obtained reference information to another mobile terminal device that already transmits the reference information request signal.

The data structure of the condition table 21 may be designed to store the reference information data 24. In this case, each record has at least one field for storing the radio communication conditions obtained from other mobile terminal devices T2 to T7 and a field for storing the reference information corresponding to the radio communication condition. FIG. 23 is a diagram illustrating the data structure of the condition table 21 for simultaneously storing the reference information data 24.

The condition table 21 has a "communication carrier" field for storing the identifier of the communication carrier as the reference information in addition to the "used RAT" field, the "used frequency band" field and the "frequency" field similar to the fields provided for the tables in FIGS. 3 and 4. The "communication carrier" field stores the identifier of the communication carrier for providing services under the radio communication condition specified by values of the "used RAT" field and the "used frequency band" field.

FIG. 24 is a diagram illustrating a fourth example of the condition table 21. In the example in FIG. 24, the condition table 21 indicates that a communication carrier for providing services under the radio communication condition that the RAT is GSM and the used frequency band is f10 [GHz] is a "carrier B", and a communication carrier for providing services under the radio communication condition that the RAT is LTE and the used frequency band is f9 [GHz] is a "carrier A".

According to the embodiment, the priority determining unit 14 determines the priority of the radio communication conditions in accordance with the reference information corresponding to the radio communication conditions on the basis of the priority determining reference prescribed by a priority reference table 25 stored in the storing unit 13. The priority reference table 25 is a table illustrating a correspondence relationship between the reference information and the priority thereof. FIG. 25 is a diagram illustrating an example of the priority reference table 25. As illustrated in FIG. 25, the priority of the communication carriers is sequentially higher in order of the carrier A, carrier B, and carrier C.

As will be described hereinbelow, the priority determining unit 14 may determine the priority of the radio communication conditions by taking precedence over the priority of the communication carriers. FIG. 26 is a diagram illustrating a second example of the priority of the radio communication conditions. The priority determining unit 14 sets the priority of the radio communication condition for providing services by the communication carrier A with a higher priority to be higher than the priority of the radio communication condition for providing services by the communication carrier B with a lower priority. The priority determining unit 14 determines the priority of the radio communication conditions used by the same communication carrier depending on the scale of the frequency stored in the condition table in FIG. 24.

Figure 27:
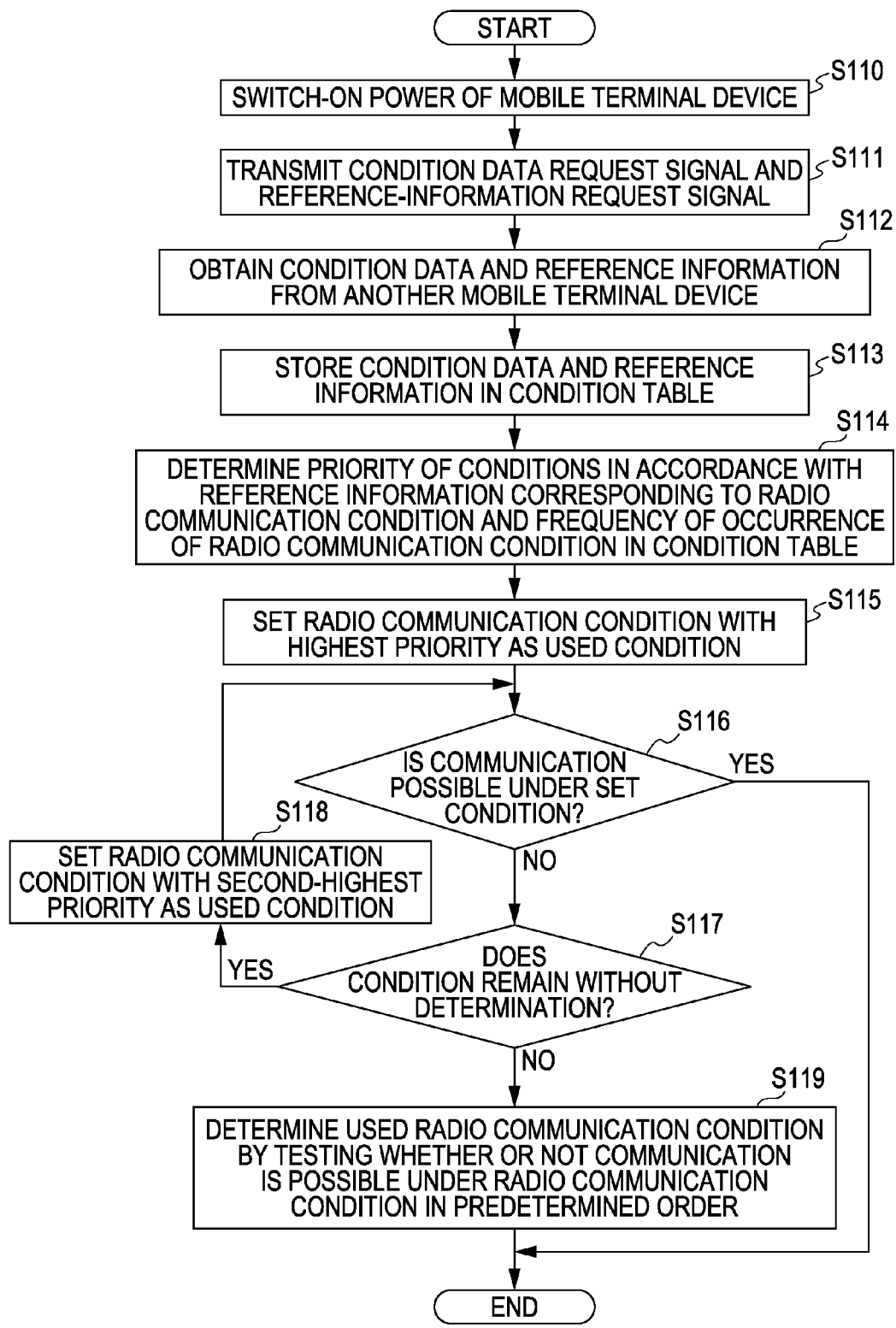
FIG. 27 is a flowchart illustrating a seventh example of the disclosed setting method of the radio communication condition.

FIG. 27 is a flowchart a seventh example of the disclosed setting method of the radio communication condition. The flowchart indicates a method for creating the condition table 21 illustrated in FIG. 24 and setting the radio communication condition when the power of the mobile terminal device T1 is ON. In step S110, the power of the mobile terminal device T1 is ON. In step S111, the condition obtaining unit 12 transmits the condition data request signal and the reference information request signal via the communication line realized by the inter-terminal communication unit 11.

FIG. 28 is a second example of an operating flowchart of the mobile terminal device T2 that receives the condition data request signal. Other mobile terminal devices T3 to T7 that receive the condition data request signal perform the same processing. In step S120, the mobile terminal device T2 receives the condition data request signal and the reference information request signal transmitted from the mobile terminal device T1. In step S121, the request signal processing unit 17 obtains the condition data and reference information to be transmitted to the mobile terminal device T1. In step S122, the request signal processing unit 17 in the mobile terminal device T2 transmits the obtained condition data and reference information to the mobile terminal device T1 that transmits the condition data request signal and the reference information request signal. Processing for obtaining and transmitting the condition data by the request signal processing unit 17 to is similar to the processing described above with reference to steps S21 and S22 illustrated in FIG. 6.

Referring back to FIG. 27, in step S112, the condition obtaining unit 12 in the mobile terminal device T1 receives the condition data and the reference information transmitted from another mobile terminal device T2. In step S113, the condition obtaining unit 12 stores the received condition data and reference information in the condition table 21. The processing for storing the condition data by the condition obtaining unit 12 may be similar to the processing described with reference to step S4 illustrated in FIG. 5. The condition obtaining unit 12 stores the reference information in a "communication carrier" field of records of the "used RAT" field and the "used frequency band" field in which the radio communication condition corresponding to the reference information is stored in the condition table 21.

In step S114, the priority determining unit 14 determines the priority of the radio communication conditions stored in the condition table 21. The priority determining unit 14 sets the priority of the radio communication conditions in accordance with the reference information corresponding to the radio communication conditions and the frequency of occurrence of the radio communication conditions. For example, the priority determining unit 14 determines the priority with the above-mentioned determining method with reference to FIG. 26.

In step S115, the condition check section 16 in the condition setting unit 15 sets the radio communication condition with the highest priority determined by the priority determining unit 14 as a condition used in the radio communication of the radio communication unit 10. In step S116, the condition check section 16 determines whether or not the radio communication unit 10 can communicate with the base station under the set radio communication condition.

When it is determined in step S116 that communication with the base station is possible under the set radio communication condition, the processing ends. As a consequence thereof, the radio communication condition determined in the determination in step S116 is thereafter set as the radio communication condition used by the mobile terminal device T1. The condition check section 16 may store the currently set radio communication condition as the setting value data 22 in the storing unit 13.

When it is determined in step S116 that communication with the base station is not possible under the set radio communication condition, the processing advances to step S117. In step S117, the condition check section 16 determines whether or not the condition for the radio communication conditions stored in the condition table 21 remains without the determination in step S116 as whether or not communication with the base station is possible.

When the radio communication condition remain without the determination, in step S118, the condition check section 16 sets the radio communication condition of the second-highest priority of that of the radio communication condition determined in just before step S116, as a condition used in the radio communication of the radio communication unit 10, and the processing returns to step S116. When it is determined in step S116 that the RAT does not remain without the determination, in step S119, the condition check section 16 sets the radio communication condition, similarly to step S10 illustrated in FIG. 5.

FIG. 29 is a flowchart illustrating an eighth example of the disclosed setting method of the radio communication condition. The flowchart indicates a method for periodically creating the condition table 21 illustrated in FIG. 24 by the mobile terminal device T1 and setting the radio communication condition. In steps S130 to S132, the condition data and the reference information are obtained from other mobile terminal devices T2 to T7, similarly to steps S111 to S113 illustrated in FIG. 27. The radio communication condition and reference information indicated by the obtained condition data are stored in the condition table 21.

In step S133, the condition setting unit 15 determines whether or not it is time to change the setting of the used RAT or frequency band. When it is not time to change the setting of the used RAT or frequency band, the processing returns to step S130. The mobile terminal device T1 iteratively executes the processing in steps S130 to step S133 for a predetermined period.

When it is determined in step S133 that it is time to change the setting of the used RAT or frequency band, the processing advances to step S134. In the following steps S134 to S139, the used RAT or frequency band is set with the processing similar to steps S114 to S119 illustrated in FIG. 27.

According to the embodiment, services of a specific communication carrier are more easily used prior to services of another communication carrier. Alternatively, services of a specific communication carrier are hardly used, as compared with services of another communication carrier. As a consequence, the use of services of communication carriers is promoted or suppressed in accordance with a relationship with a vender of the mobile terminal device.

As the reference information, an identifier of the vender may be used. The identifier of the vender is used as the reference information, thereby, when there is nearby a mobile terminal device of a specific vender, such as the mobile terminal device of the same vender, easily communicating data under the same radio communication condition as that of the mobile terminal device. With the advantages, as long as the communication is performed under the same radio communication condition between a plurality of mobile terminal devices of the same vender, upon using the specific service, it is possible to improve the convenience of a user that the service is easily used.

As the reference information, an identifier of the type of the mobile terminal device may be used. By using the identifier of the vender as the reference information, when there is nearby a mobile terminal device of a specific type, e.g., the same type or the same series of the mobile terminal device, the communication becomes easier under the same radio communication condition as that of the mobile terminal device. With the advantage, as long as the communication is performed under the same radio communication condition between a plurality of mobile terminal devices of the same type or the same series, upon using a specific service, it is possible to improve the convenience of a user that the service is easily used.

As the reference information, the identifier of the service available by the mobile terminal device may be used. By using the service identifier as the reference information, when there is nearby a mobile terminal device using the same service, the communication becomes easier under the same the radio communication condition as that of the mobile terminal device. With the advantage, as long as the communication is performed under the radio communication condition having the same service, the convenience of the service is improved.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a illustrating of superiority and inferiority of the invention. Although the embodiment of the present inventions have been described in detail, it should be understood that the various changes, substitutions, and alternations could be made hereto without departing from the spirit and scope of the invention.

What is claimed is:

1. A mobile terminal device comprising:
a receiver configured to receive directly one or more radio signals transmitted from one or more other mobile terminal devices, each of the radio signals including one or more radio communication conditions determined by each of the one or more other mobile terminal devices for use in communication with a base station;
a processor coupled to the receiver and configured to:
acquire a plurality of radio communication conditions for use in communication with the base station, from the one or more radio signals, each of the plurality of radio communication conditions including a radio access technology for use in communication with the base station among a plurality of radio access technologies,
determine priority between the plurality of radio access technologies of the plurality of radio communication conditions, in accordance with a number of times that each of the plurality of radio communication conditions including each of the plurality of radio access technologies is received from the one or more other mobile terminal devices,
set one of the plurality of radio communication conditions currently available in order of the priority for use in communication with the base station, wherein
each of the plurality of radio communication conditions includes a combination of the radio access technology and a frequency band among a plurality of frequency bands, and
the processor is configured to determine priority between a plurality of combinations each including the radio access technology and the frequency band, in accordance with a number of times that each of the plurality of radio communication conditions including each of the plurality of combinations is received from the one or more other mobile terminal devices.

2. The mobile terminal device according to claim 1, wherein the processor is configured to acquire reference information corresponding to each of the plurality of radio communication conditions, the reference information being transmitted from the one or more other mobile terminal devices and received by the receiver, and to determine the priority in accordance with the reference information.

3. The mobile terminal device according to claim 2, wherein the reference information is communication carrier information, vender information, identifier of a type of the mobile terminal device or a combination of them, the communication carrier information being indicative of a carrier providing communication services, the vender information being indicative of a vender of the mobile terminal device.

4. A communication system comprising:
a plurality of base stations; and
a mobile terminal device including:
a receiver configured to receive directly one or more radio signals transmitted from one or more other mobile terminal devices, each of the radio signals including one or more radio communication conditions determined by each of the one or more other mobile terminal devices for use in communication with one of the plurality of base stations; and
a processor coupled to the receiver and configured to:
acquire a plurality of radio communication conditions for use in communication with the one of the plurality of base stations, from the one or more radio signals, each of the plurality of radio communication conditions including a radio access technology for use in communication with the one of the plurality of base stations among a plurality of radio access technologies,
determine priority between the plurality of radio access technologies of the plurality of radio communication conditions, in accordance with a number of times that each of the plurality of radio communication conditions including each of the plurality of radio access technologies is received from the one or more other mobile terminal devices,
set one of the plurality of radio communication conditions currently available in order of the priority for use in communication with the one of the plurality of base stations, wherein each of the plurality of radio communication conditions includes a combination of the radio access technology and a frequency band among a plurality of frequency bands, and
the processor is configured to determine priority between a plurality of combinations each including the radio access technology and the frequency band, in accordance with a number of times that each of the plurality of radio communication conditions including each of the plurality of combinations is received from the one or more other mobile terminal devices.

5. The communication system according to claim 4, wherein
the mobile terminal device is configured to communicate with other mobile terminal devices via one of the plurality of base stations, at least one of the plurality of base stations using a radio access technology different from that of at least one other of the plurality of base stations.

6. A communication method executed in a mobile terminal device, the method comprising:
receiving directly one or more radio signals transmitted from one or more other mobile terminal devices, each of the radio signals including one or more radio communication conditions determined by each of the one or more other mobile terminal devices for use in communication with a base station;
acquiring a plurality of radio communication conditions for use in communication with the base station, from the one or more radio signals, each of the plurality of radio communication conditions including a radio access technology for use in communication with the base station among a plurality of radio access technologies,
determining, by a processor of the mobile terminal device, priority between the plurality of radio access technologies of the plurality of radio communication conditions, in accordance with a number of times that each of the plurality of radio communication conditions including each of the plurality of radio access technologies is received from the one or more other mobile terminal devices,
setting one of the plurality of radio communication conditions currently available in order of the priority for use in communication with the base station, wherein each of the plurality of radio communication conditions includes a combination of the radio access technology and a frequency band among a plurality of frequency bands, and the priority determining includes determining priority between a plurality of combinations each including the radio access technology and the frequency band, in accordance with a number of times that each of the plurality of radio communication conditions including each of the plurality of combinations is received from the one or more other mobile terminal devices.

* * * * *